United States Patent [19]

Ochiai

[11] Patent Number: 5,581,451
[45] Date of Patent: Dec. 3, 1996

[54] CIRCUIT FOR IMPROVING THE POWER EFFICIENCY OF AN AC/DC CONVERTER

[75] Inventor: Masashi Ochiai, Saitama-ken, Japan

[73] Assignee: Kabushiki Kaishat Toshiba, Kanagawa-ken, Japan

[21] Appl. No.: 341,903

[22] Filed: Nov. 15, 1994

[30] Foreign Application Priority Data

Nov. 15, 1993 [JP] Japan .................................. 5-285059

[51] Int. Cl.⁶ .................................................. H02M 3/335
[52] U.S. Cl. .............................. 363/21; 363/16; 363/131; 363/44; 323/222
[58] Field of Search ................................ 363/21, 20, 67, 363/16, 108, 116, 37, 53, 131–133, 75, 90, 101, 44, 47; 323/251, 222; 336/69

[56] References Cited

U.S. PATENT DOCUMENTS

| | | | |
|---|---|---|---|
| 4,524,411 | 6/1995 | Willis | 363/21 |
| 5,343,381 | 8/1994 | Bolduc et al. | 363/47 |
| 5,390,099 | 2/1995 | Rilly et al. | 363/16 |

FOREIGN PATENT DOCUMENTS

WO92/02983  2/1992  WIPO .

OTHER PUBLICATIONS

Electronics Techniques, vol. 35, No. 3, 1993, pp. 56–65.

Primary Examiner—Peter S. Wong
Assistant Examiner—Aditya Krishnan
Attorney, Agent, or Firm—Cushman, Darby & Cushman

[57] ABSTRACT

A power circuit including an input circuit for receiving an AC power supply voltage from an AC power line, a primary circuit rectifier coupled to the input circuit for rectifying the AC power supply voltage, a transformer having a primary winding, a secondary winding and a tertiary winding. DC coupling member for coupling an output terminal of the primary circuit rectifier to one end of the primary winding of the transformer, a secondary circuit rectifier for rectifying a secondary circuit AC voltage induced across the secondary winding of the transformer to output a DC voltage resulted by its rectification from the power circuit, a switching element coupled to the other end of the primary winding of the transformer, a controller for controlling the duty ratio of the ON/OFF operations of the switching element so as that the output DC voltage from the secondary circuit rectifier is regulated, and a switched frequency AC signal generator, including the tertiary winding of which one end is coupled to one end side of the primary winding of the transformer and a first smoothing capacitor coupled between the other end of the tertiary winding and a reference potential line, for generating an AC signal responsive to the duty ratio of the ON/OFF operation of the switching element across the tertiary winding.

6 Claims, 19 Drawing Sheets

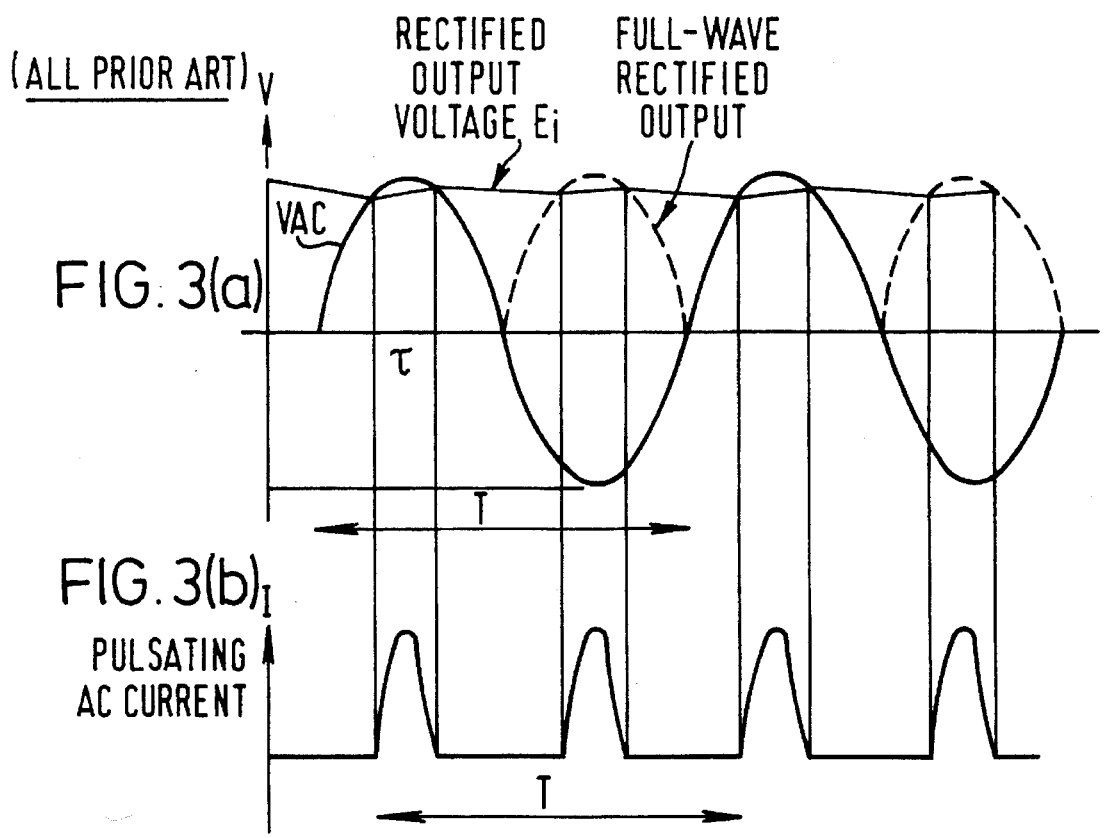
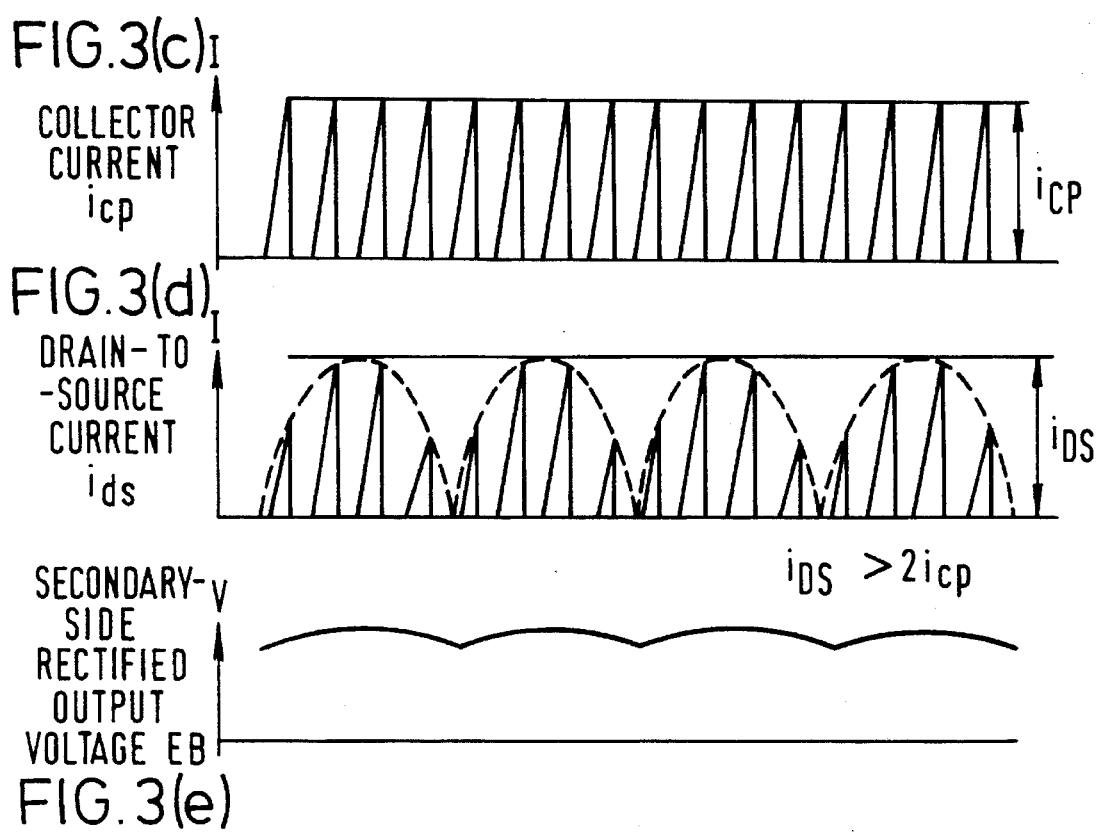

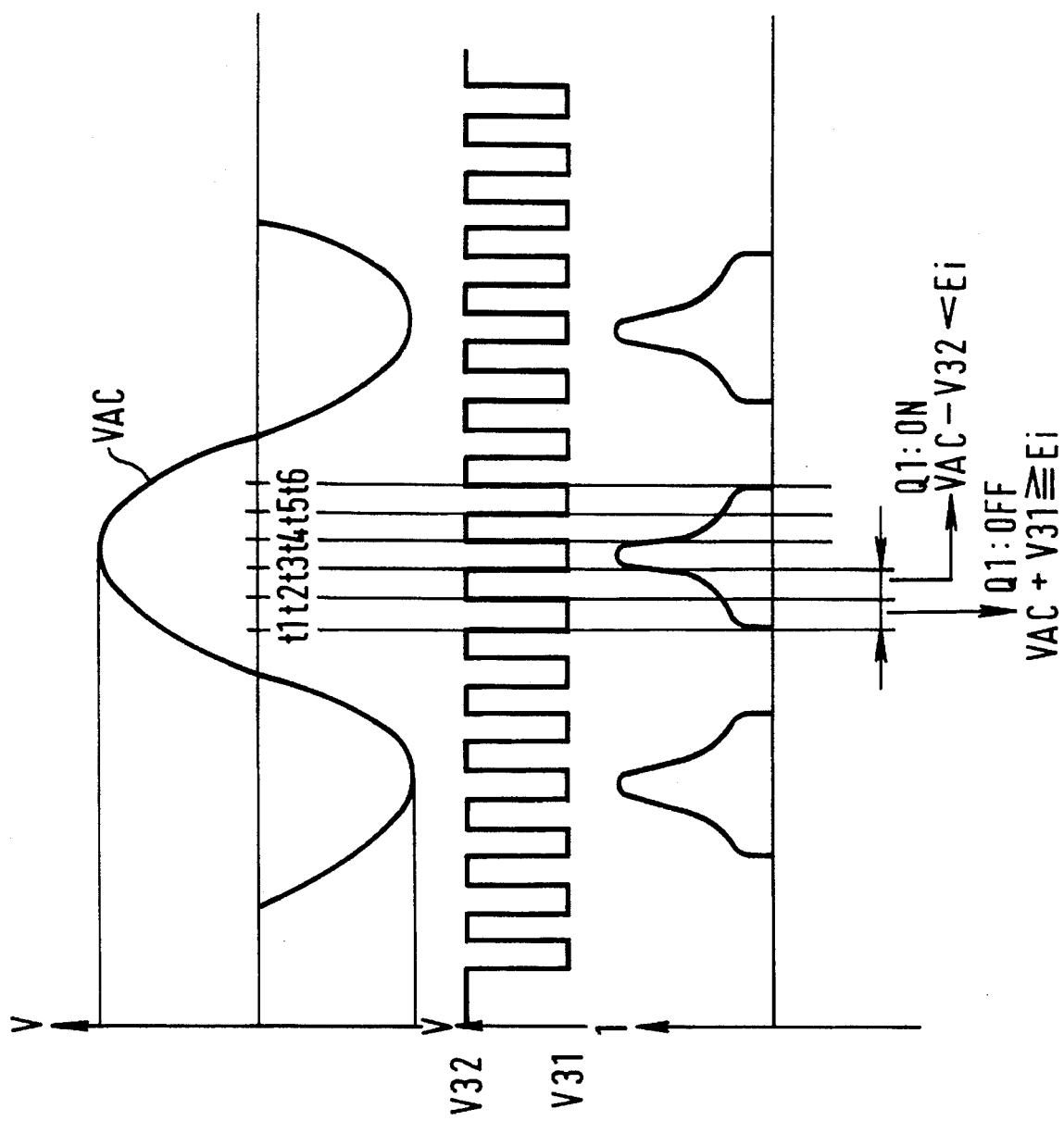

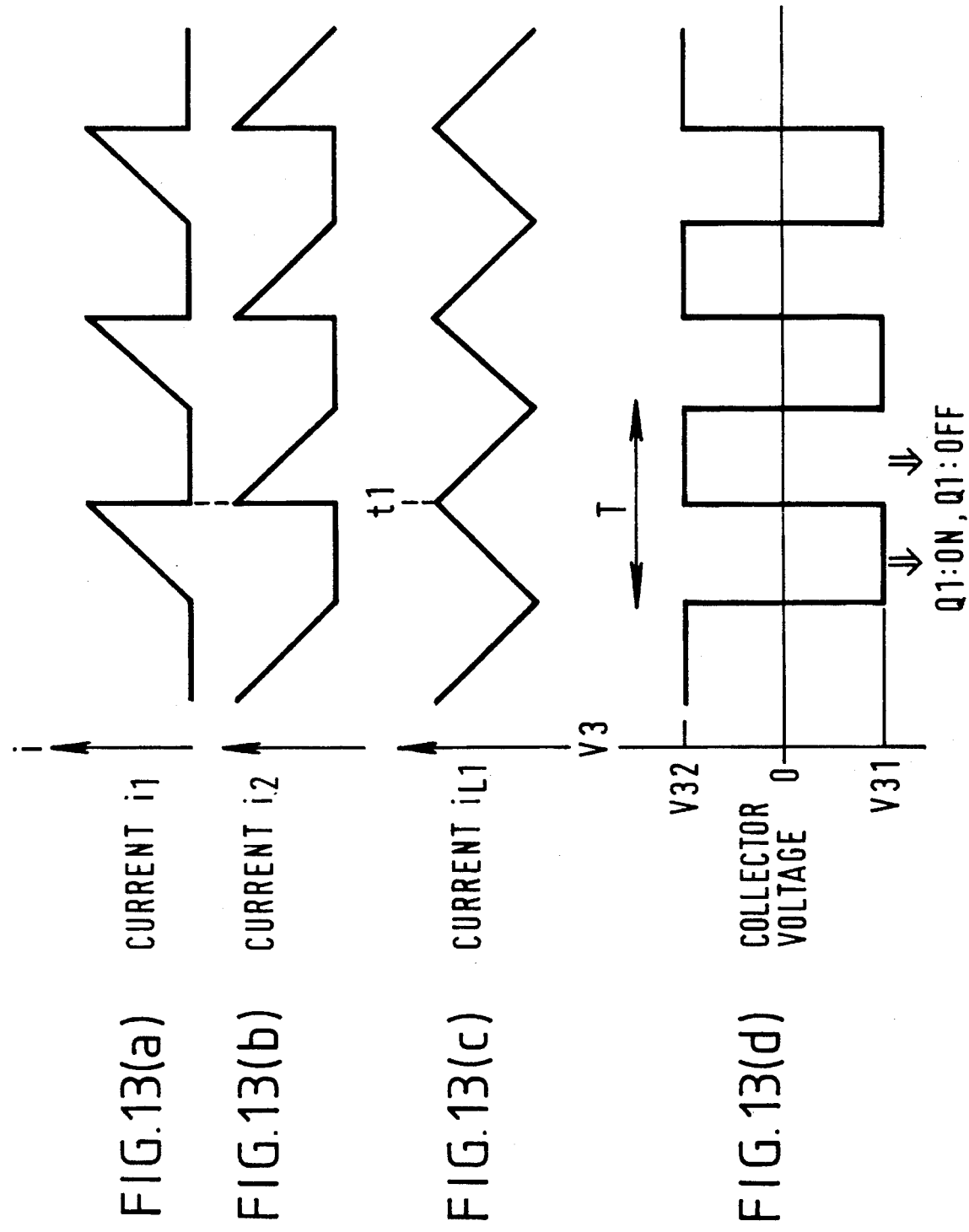

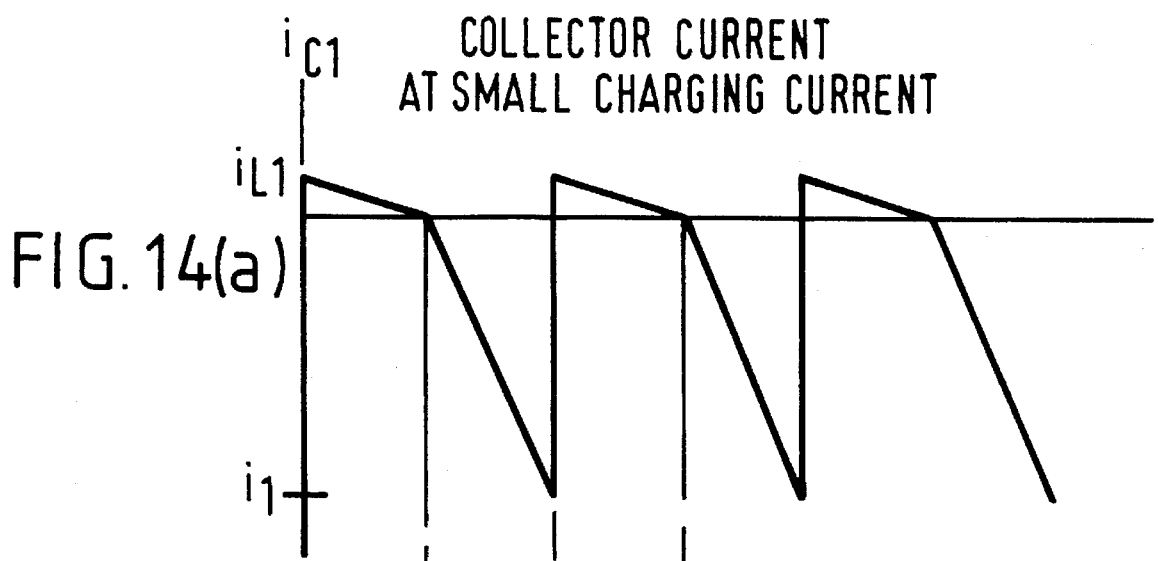
FIG. 14(a) COLLECTOR CURRENT AT SMALL CHARGING CURRENT
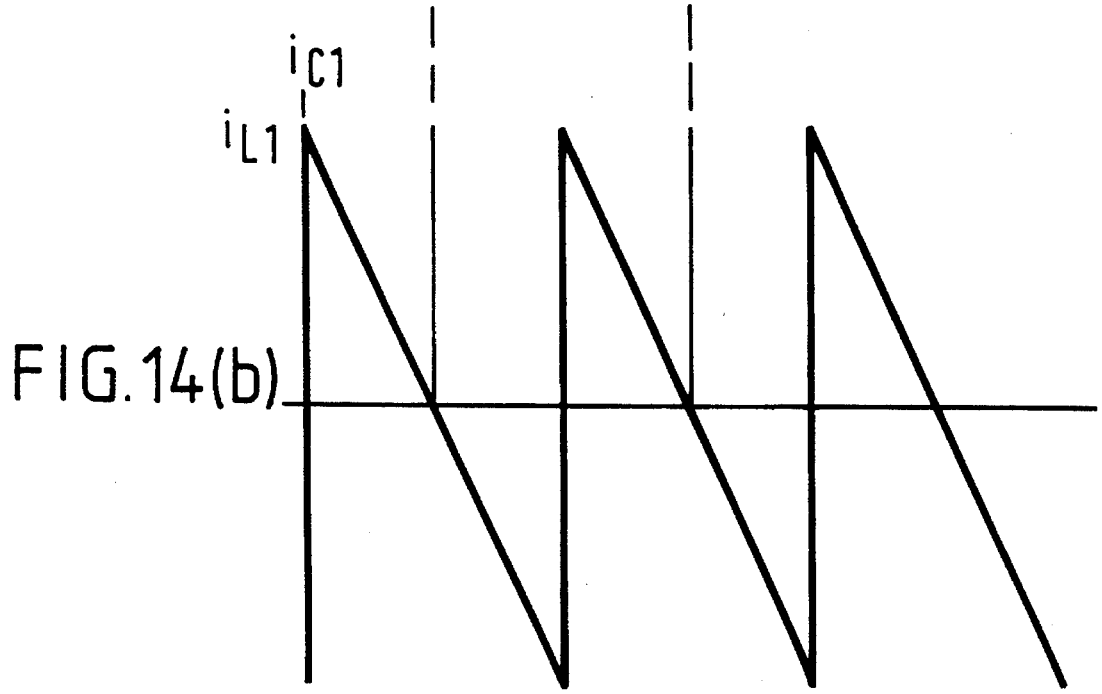
FIG. 14(b) COLLECTOR CURRENT AT LARGE CHARGING CURRENT

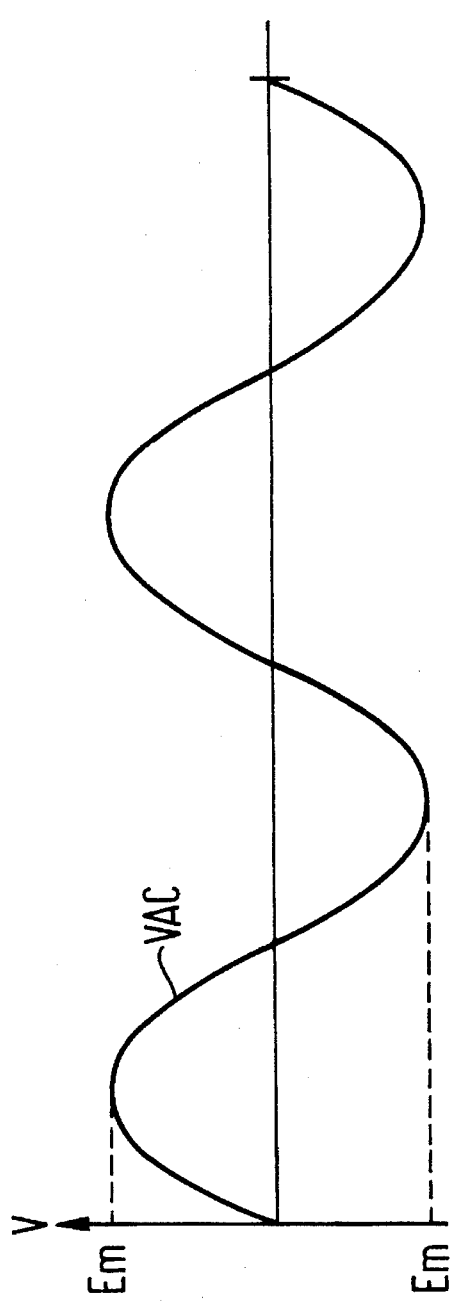
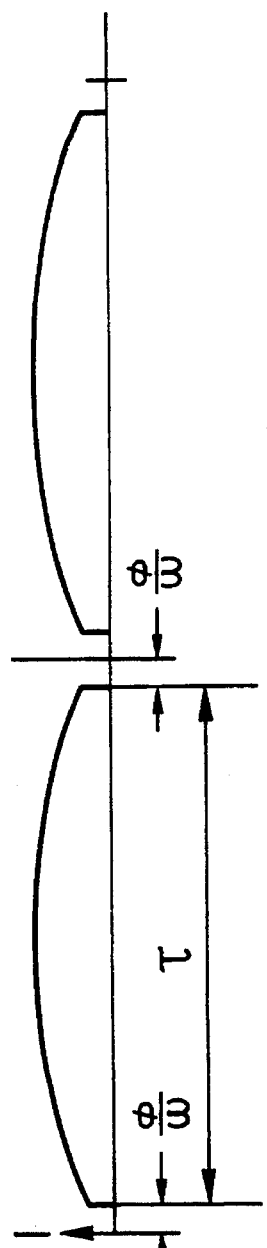
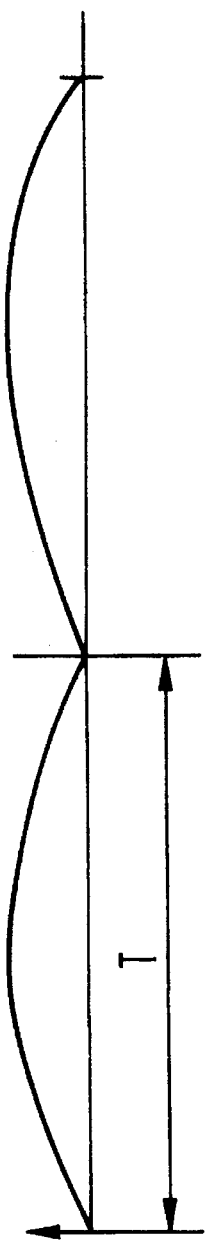
FIG.18(a)
FIG.18(b)
FIG.18(c)

CIRCUIT FOR IMPROVING THE POWER EFFICIENCY OF AN AC/DC CONVERTER

FIELD OF THE INVENTION

The present invention relates to a power circuit for providing an AC/DC conversion, and more particularly, to a power circuit having an improved AC/DC conversion efficiency.

BACKGROUND OF THE INVENTION

Power circuits are employed in a variety of applications such as AC/DC conversion circuits, DC/DC conversion circuits, etc., in which developed taking conversion efficiency, power efficiency, etc., must be taken into consideration. Switching regulator type power circuits are mainly used for large power consumption devices, while series path type power circuits are used for other devices requiring a precision output voltage. Switching speeds and ripple factors, etc. must be considered when using switching regulator type power circuits. Losses in circuit elements, transmission efficiencies, etc., must be considered when using series path power circuits. The effective power of an AC circuit is determined by the phase between voltage and current. The performance relating the phase is generally expressed as a power factor.

FIG. 1 shows a conventional power circuit.

In FIG. 1, an AC power source PS1 is connected to a full-wave rectifier circuit DB1. The full-wave rectifier circuit DB1 supplies its rectified output to a switching regulator, i.e., the load circuit of the full-wave rectifier circuit DB1 after smoothing by capacitor C5. The switching regulator includes a transformer T1 and a switching transistor Q1. A starting circuit comprised of a half-wave rectifier diode D1 and a capacitor C2 is also connected to the switching regulator from the return line in the single phase AC loop of the full-wave rectifier circuit DB1 via a resistor R2.

A DC power output VCC is supplied to a voltage regulating circuit IC1 from a half-wave rectifier circuit D2 coupled to a tertiary winding L4 of the transformer T1 after smoothed by capacitor C3. The output of the voltage regulating circuit IC1 is supplied to the base of the transistor Q1.

The collector of the transistor Q1 is connected to one end of the primary winding LP of the transformer T1 and the other end of the primary winding LP is connected to the smoothing capacitor C5 and the rectifier circuit DB1.

An AC voltage induced across secondary winding L2 of the transformer T1 is rectified through a diode D3 and then the rectified voltage from the diode D3 is output from the output terminal 1 of the power circuit as a stabilized output after being smoothed by capacitor C4 coupled between the cathode of the diode D3 and the reference potential line.

An error amplifier IC2, detecting fluctuating components of the output voltage, is connected to the cathode of the diode D3. The output of the error amplifier IC2 is connected to the cathode of a control diode A1 which comprises a part of a photo-coupler and then the anode of the control diode A1 is connected to the output terminal 1 via a resistor R5. The emitter of a transistor Q2 constituting the other part of the photo-coupler is coupled to the control terminal of the voltage regulating circuit IC1 while the collector is connected to DC power VCC output of the half-wave rectifier circuit D2 through a resistor R4.

Next, the operation of the conventional power circuit, as shown in FIG. 1, will be explained using the operating power waveform, as shown in FIGS. 3(d) through 3(e).

Due to smoothing capacitor C5, during the period $\tau$, as shown in FIG. 3(a) when an input AC voltage VAC is higher than rectified output voltage $E_1$, in other words, the period when the rectified output voltage Ei drops below the AC input voltage VAC by being supplied to the adding circuit, a pulsating AC current, as shown in FIG. 3(b) flows through the rectifier diode DB1 to turn ON the diode DB1. Further, FIG. 3(c) shows the collector current of the transistor Q1.

Generally, the smoothing capacitor C5 cannot be too small when ripples contained in the output voltage EB of the switching regulator are taken into account. In this case, the power ON duration $\tau$ of the rectifier diode is extremely short.

According to the actual measurement, the power ON duration $\tau$ is approximately 2 to 2.5 mS when C1 is 470 μF and the load power is 80 W.

Therefore, the case of the circuit shown in FIG. 1, the power factor is as low as 0.6 (60%) and a harmonic waves current contained in the pulsating current in the AC power source is also large. In order to increase the power factor and to reduce the harmonic waves current, it is necessary to extend the ON duration $\tau$ of a diode. In general, when current i (t) is expressed using a Fourier series, the following Equation 1 will be obtained:

$$i(t) = a_0 + \sum_{n=1}^{\infty} (a_n \sin n\omega t + b_n \cos n t\omega) \quad \text{[Equation 1]}$$

Here, if i(t) is a unit step function, as shown in FIG. 4(a), a DC component $a_0$ and AC components $a_n$, $b_n$ will be expressed by the following Equation 2.

$$a_0 = \frac{1}{T} \int_0^t i(t)dt = \frac{2}{T} \int_0^{\tau_2} i(t)dt = \frac{2\tau_2}{T} \quad \text{[Equation 2]}$$

$$a_n = \frac{4}{T} \int_0^{\tau_2} \sin n\omega\, dt = \frac{4}{T} \cdot \frac{1}{n\omega} (1 - \cos n\omega\tau_2)$$

$$b_n = \frac{4}{T} \int_0^{\tau_2} \cos n\omega\, dt = \frac{4}{T} \cdot \frac{1}{n\omega} \sin n\omega\tau_2$$

If the r.m.s. value of the fundamental wave current where n=1 is $i_1$, the r.m.s. value of the harmonic waves current is $i_n$, and the r.m.s. value of i(t) is $i_{rms}$, relationship among $i_1$, $i_n$ and $i_{rms}$ is given by the following Equation 3.

$$i_1 = \frac{\sqrt{a_1^2 + b_1^2}}{\sqrt{2}} = \quad \text{[Equation 3]}$$

$$\frac{1}{\sqrt{2}} \cdot \frac{4}{\omega T} \sqrt{2(1 - \cos \omega\tau_2)^2} = \frac{2}{\pi}(1 - \cos \omega\tau_2)$$

$$i_n = \sqrt{i_{rms}^2 + i_1^2}$$

If the power ON duration $\tau_2$ of the diode in the above Equation 3 is extended, the fundamental wave current $i_1$ increases and a power factor also increases. On the other hand, the harmonic wave current $i_n$ decreases.

The power circuit, as shown in FIG. 2, has been devised improve this power factor. The power circuit of FIG. 2 is an example where a MOSFET switching transistor Q3 was used along with other parts are identical to the circuit of FIG.

1 except that the smoothing capacitor C5 was not used after rectification. The power circuit of FIG. 2 is also an example where the power efficiency was improved by the operation of a voltage driving type device by making the most of operating characteristics such as the switching speed, etc., and by utilizing a rectified pulsating voltage.

Smoothing capacitor C5 is not provided in FIG. 2 after the AC power was rectified and a switching regulator is operated directly by the AC voltage.

In this case, since the switching transistor Q3 operates over the whole period T, correspondingly the ON duration of the rectifier diode extends to T/2 and the value of the power factor obtained is above 0.9.

While there is a power factor improvement, there are other drawbacks that will be explained below.

The drain-to-source current $i_{DS}$ flowing through a. MOSFET switching transistor Q3 in the operating state is shown in FIG. 3(d). Its envelope has a sine-wave shape, and thus the drain-to-source current $i_{DS}$ becomes small in a time period where AC voltage is low, while it becomes large when the AC voltage reaches around a peak value.

The collector current $i_{CP}$ of the transistor Q1 in FIG. 1 is smoothed, as shown in FIG. 3(c), by the smoothing capacitor. Therefore, when this collector current is compared with the drain-to-source current $i_{DS}$ of the transistor Q3 at a same load (the same mean current) condition, the drain-to-source current $i_{DS}$ of the transistor Q3 becomes two or more times the collector current $i_{CP}$. Because of this, the rating of the transistor Q3 (MOSFET) becomes large and it becomes necessary to make the large transistor in connection with the saturation of the switching transformer core and thus manufacturing will increase.

The circuit shown in FIG. 2 is an example where a current driving type bipolar transistor was changed to a voltage driving type bipolar transistor and the characteristics of a power source using the MOSFET type switching transistor Q3 are improved in view of characteristics such as the switching speed, the input impedance, etc. However, as far as cost is concerned, there is cost increase as over-ratings and over-specifications of performance are demanded and one is forced to use larger parts to accomodate the maximum operating range when compared with the bipolar transistor.

Since the second rectified output voltage of the switching regulator has a sine-wave enveloped ripple voltage, as shown in FIG. 3(e), it becomes necessary to provide a switching regulator using a series path type regulator or a choke coil at the secondary side.

The operation holding time during the momentary stoppage of AC power is too short because no smoothing capacitor is provided. Therefore, there is the problem that the output voltage EB drops largely due to the fluctuation in the input line or a momentary fluctuation of external noise and distortions will appear on the screen when the invention is applied to a TV set. The product performance is thus deteriorated.

Since the current flowing through the switching transistor has the sine-wave envelope, as described in reference to the first drawback, if a current driving type bipolar transistor is used as a switching element, the base current (the driving current) also must be modulated to the sine-wave envelope.

However, there was a problem in that it was actually difficult to use a current driving type transistor because of a difference between ON and OFF durations or restriction of switching speed of a current driving type PN junction transistor which had to use a voltage driving type MOSFET.

As described above, a conventional circuit has the drawbacks of a low power factor and the power efficiency is worse. A voltage driving type FET is used as a switching element, its power efficiency can be improved by characteristics such as the switching speed, and the input impedance, etc. However, there was a problem that in view of the cost, it is expensive and furthermore, the number of additional circuits as well as component parts will increase and the circuit will become larger.

SUMMARY OF THE INVENTION

It is an object of the present invention to provide a power circuit that is cheap and capable of obtaining a high power factor.

A power circuit according to a first aspect of the present invention includes an input circuit for receiving an AC power supply voltage from an AC power line, a primary circuit rectifier coupled to the input circuit for rectifying the AC power supply voltage, a transformer having a primary winding, a secondary winding and a tertiary winding, a DC coupling member for coupling an output terminal of the primary circuit rectifier to one end of the primary winding of the transformer, a secondary circuit rectifier for rectifying a secondary circuit AC voltage induced across the secondary winding of the transformer to output a DC voltage resulted by its rectification from the power circuit, a switching element coupled to the other end of the primary winding of the transformer, a controller for controlling the duty ratio of the ON/OFF operations of the switching element so as that the output DC voltage from the secondary circuit rectifier is regulated, and a switched frequency AC signal generator, including the tertiary winding having one end coupled to one side of the primary winding of the transformer and a first smoothing capacitor coupled between the other end of the tertiary winding and a reference potential line, for generating an AC signal responsive to the duty ratio of the ON/OFF operation of the switching element across the tertiary winding.

Regarding the first aspect of the power circuit, a power circuit according to a second aspect of the present invention contains a diode for rectifying the AC voltage induced on the second winding, a choke coil having one end coupled to the diode and a second smoothing capacitor coupled between the other end of the choke coil and the reference potential line.

A power circuit according to a third aspect of the present invention including an input circuit for receiving an AC power supply voltage from an AC power line, a rectifier circuit coupled to the input circuit for rectifying the AC power supply voltage, a flyback transformer having one winding, a voltage stabilizing circuit for stabilizing the rectified voltage from the output terminal of the rectifier circuit, a circuit for supplying the stabilized voltage from the voltage stabilizing circuit to one end of the winding of the flyback transformer, a horizontal output transistor coupled to the other end of the winding of the flyback transformer, a horizontal driving transformer having an input winding provided for receiving horizontal period driving pulses, and a first and a second output windings provided for controlling the switching of the horizontal output transistor, a tertiary transformer having a winding coupled by one end to the output terminal of the rectifier circuit and also inductively coupled to the second output winding, and a drive pulse frequency AC signal generator, including a smoothing capacitor coupled between the other end of the tertiary winding and a reference potential line, for generating an AC signal responsive to the drive pulse across the tertiary winding.

A power circuit according to a fourth aspect of the present invention includes an input circuit for receiving an AC power supply voltage from an AC power line, a primary circuit rectifier coupled to the input circuit for rectifying the AC power supply voltage, a transformer having a primary winding and a secondary winding, a DC coupling member, including a series circuit of a choke coil and a diode, for coupling an output terminal of the primary circuit rectifier to one end of the primary winding of the transformer, a secondary circuit rectifier for rectifying a secondary circuit AC voltage induced across the secondary winding of the transformer to output a DC voltage resulted by its rectification from the power circuit, a switching element coupled to the other end of the primary winding of the transformer, a controller for controlling the duty ratio of the ON/OFF operation of the switching element so that the output DC voltage from the secondary circuit rectifier is regulated, and a smoothing capacitor coupled between one end of the primary winding and a reference potential source.

A power circuit according to a fifth aspect of the present invention includes an input circuit for receiving an AC power supply voltage from an AC power line. A primary circuit rectifier coupled to the input circuit for rectifying the AC power supply voltage, a transformer having a primary winding and a secondary winding, a DC coupling member, including a series circuit of a first choke coil and a first diode, for coupling an output terminal of the primary circuit rectifier to one end of the primary winding of the transformer, a secondary circuit rectifier for rectifying a secondary circuit AC voltage induced across the secondary winding of the transformer to output a DC voltage derived from, a switching element coupled to the other end of the primary winding of the transformer, a controller for controlling the duty ratio of the ON/OFF operation of the switching element so as that the output DC voltage from the secondary circuit rectifier is regulated, a smoothing capacitor coupled between one end of the primary winding and a reference potential source, and a shunt circuit member including a series circuit of a second choke coil and a second diode, which is coupled between the connecting node of the first choke coil and the first diode and the other end of the primary winding.

In addition to the fifth aspect power circuit, in a power circuit according to a sixth aspect of the present invention the shunt circuit member further contains a second smoothing capacitor connected in parallel with the second diode.

According to the present invention, it is possible to extend the on time of a rectifier diode of a power circuit and achieve a higher power by adding several component parts to a conventional switching regulator and by changing connections.

BRIEF DESCRIPTION OF THE DRAWINGS

A more complete appreciation of the present invention and many of the attendant advantages thereof will be readily obtained by reference to the following detailed description in connection with the accompanying drawings, wherein:

FIGS. 3(a) through 3(e) are diagrams for explaining the relationship between the AC voltages and AC currents of a conventional power circuit and switching transistors (bipolar transistor and MOSFET):

FIGS. 8(a), 8(b) and 8(c) show waveforms of parts of the circuit shown in FIG. 5;

FIGS. 13(a) through 13(d) show operating waveforms of primary and secondary side currents and collector voltage of a switching transistor:

FIGS. 14(a) and 14(b) are diagrams for explaining the charging current flowing into the capacitor C1:

FIGS. 18(a), 18(b) and 18(c) are diagrams showing the operating waveforms of AC currents shown in FIGS. 11, 15 and 17.

DESCRIPTION OF THE PREFERRED EMBODIMENTS

Figure 1:
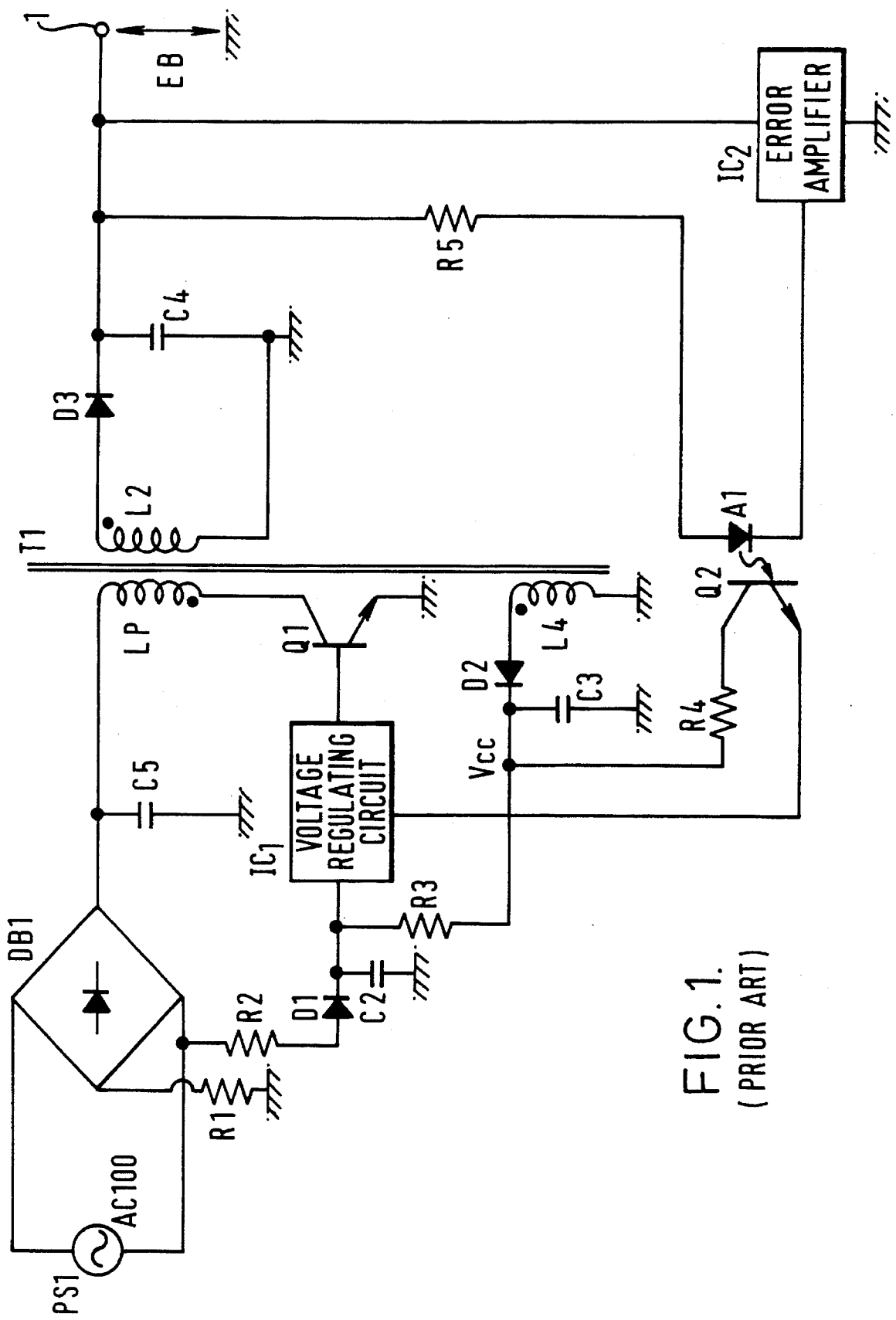
FIG. 1 is a circuit diagram showing a conventional power circuit using a bipolar device.
Figure 2:
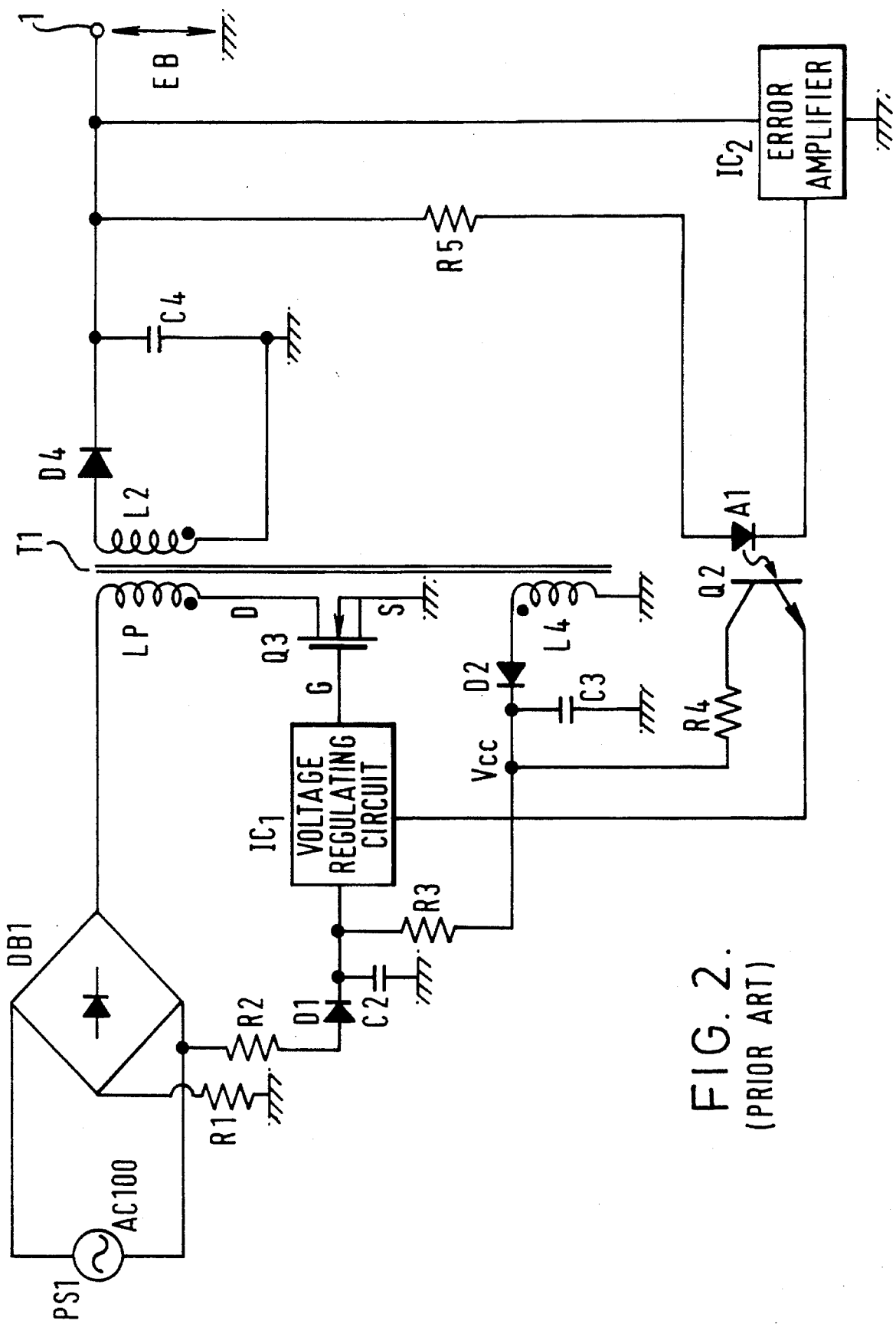
FIG. 2 is a circuit diagram showing a conventional power circuit using MOSFET.
Figures 4A, 4B:
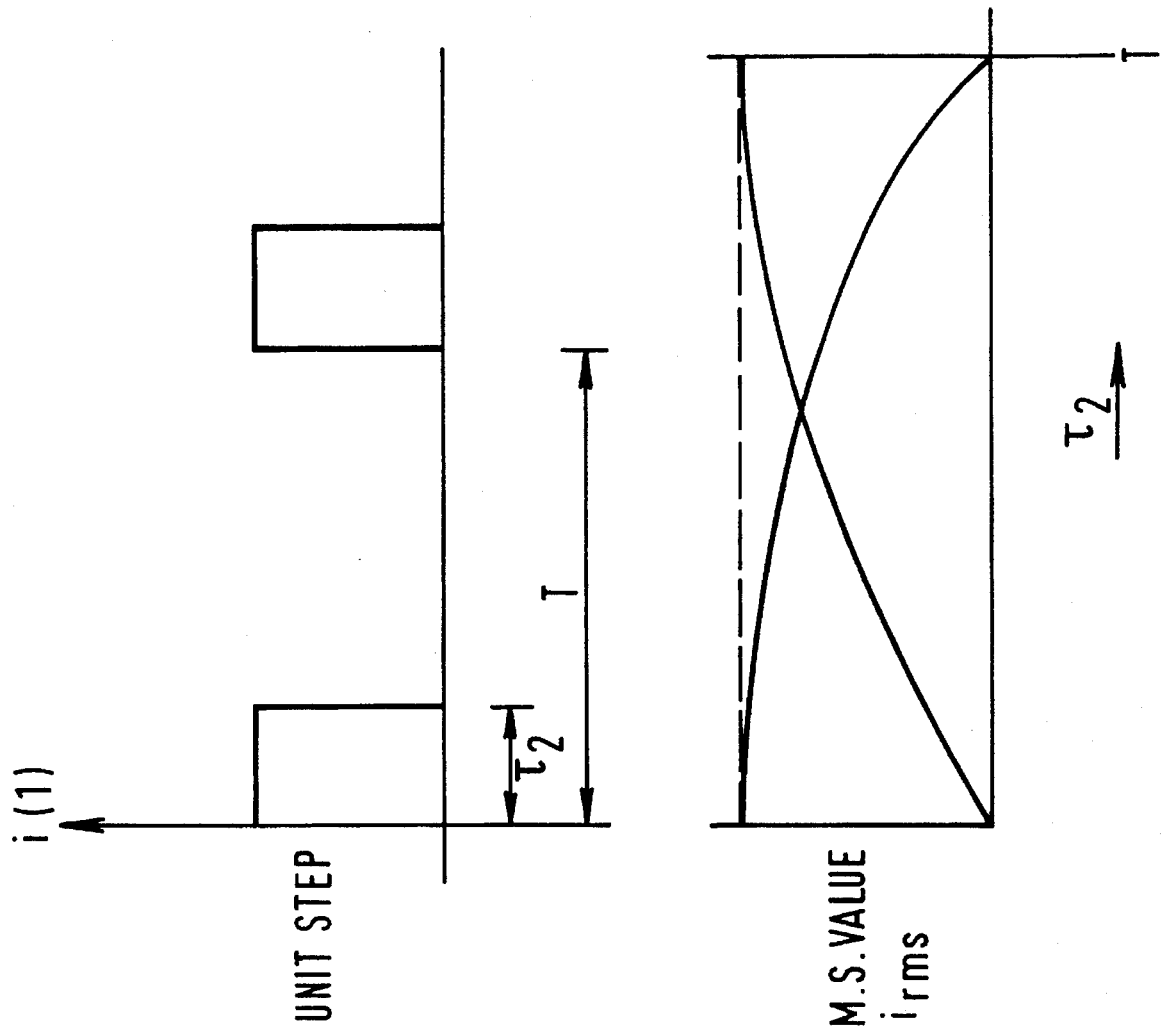
FIGS. 4(a) and 4(b) are diagrams for explaining the relation among a unit step current waveform, the fundamental wave current $i_f$ and harmonic current $i_n$ for calculating the AC current shown in FIGS. 3(a) through 3(e) equivalently by Fourier series.

The present invention will be described in detail with reference to FIGS. 5 through 18. Throughout the drawings, reference numerals or letters in FIGS. 1 through 4 will be used to designate like or equivalent elements for simplicity of explanation.

Figure 5:
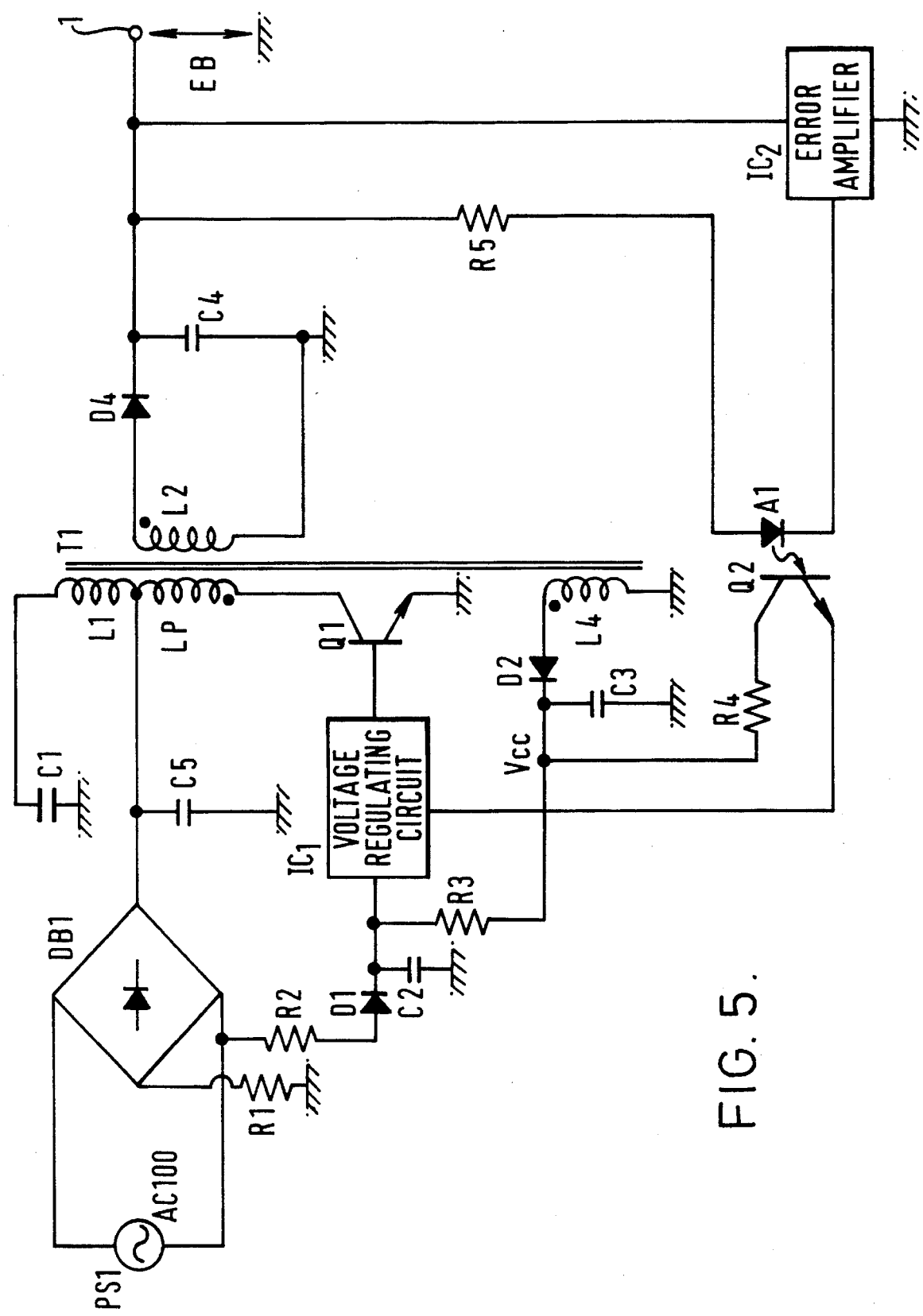
FIG. 5 is a circuit diagram showing one embodiment of a power circuit of the present invention.

FIG. 5 is a circuit diagram showing a preferred embodiment of a power circuit of the present invention.

In FIG. 5, reference numerals and letters used in FIG. 1 will be used to designate the same or like elements for simplicity of explanation.

In FIG. 5 an AC power source PS1 is connected to a full-wave rectifier circuit DB1. The output of this full-wave rectifier circuit DB1 is connected to a small capacitor C5 for removing noise and to one end of a primary winding LP of a transformer T1. The other end of the primary winding LP of the transformer T1 is connected to the collector of a transistor Q1 which is used as a switching element. A half-wave rectifier circuit comprising a diode D1 and a capacitor C2 is connected to a single-phase AC return line of the AC power source PS1 and to a voltage regulating circuit IC1 in the next stage. The output of this voltage regulating circuit IC1 is connected to the base of the transistor Q1 to regulate the current path of the primary winding of the transformer T1 and to regulate the secondary output voltage EB.

A tertiary winding L1 is connected to one end of the primary winding LP and to a reference potential at a capacitor C1.

A secondary winding L2 is connected to a half-wave rectifier circuit which is comprised of a diode D4 and a smoothing capacitor C4 and outputs stabilized voltage EB to a terminal 1. Fluctuation of the output voltage EB of the terminal 1 is detected by an error amplifier IC2 and output to the voltage regulating circuit IC1 as a feedback signal.

The feedback signal is fed back using a photo-coupler. The photo-coupler contains a control diode A1 and a transistor Q2. The drive voltage for the voltage regulating circuit and the photo-coupler is supplied by rectifying the output voltage induced across the fourth winding L4 of the transformer T1 by a half-wave rectifier diode D2 and is then smoothed by a smoothing capacitor C3.

The operation of the power circuit, as shown in FIG. 5, will be described in reference to FIGS. 6, 7 and 8.

The AC power source PS1 is applied directly to the connecting node of the tertiary winding L1 with the primary winding LP of the transformer T1 via the rectifier diode DB1. On the other hand, the switching of the switching transistor Q1 is controlled by the output of the voltage regulating circuit IC1 and the control voltage is obtained by detecting the secondary rectified output voltage EB using the error amplifier IC2 and is fed back via a photo-coupler Q2 so that the output voltage EB is controlled at a constant level. A rectified voltage from starting circuits D1 and C2 is supplied when an AC voltage is input and after the circuit reaches a steady state. Voltage VCC is obtained by the voltage induced on the winding L4 of the switching transformer and is supplied as the power source. The circuit of FIG. 5 comprises a flyback type switching regulator (stabilized power circuit), Thus, the secondary rectified output voltage EB is obtained during the flyback period of the switching transistor being OFF.

Figure 6A:
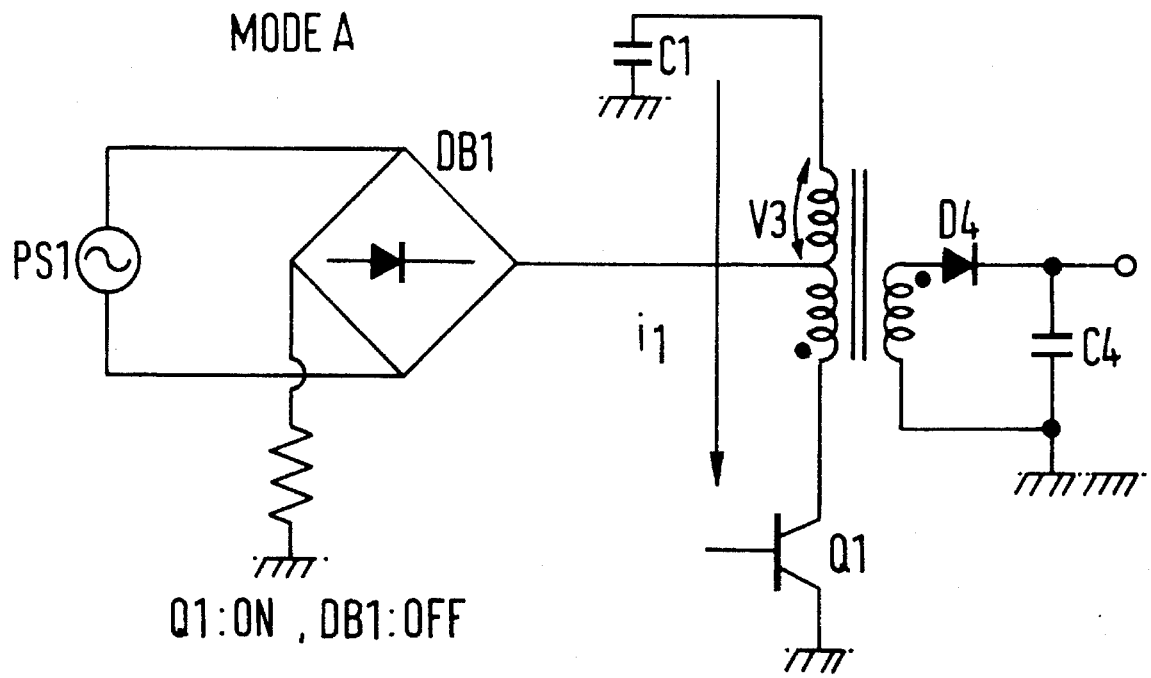
FIGS. 6(a) through 6(d) are diagrams for explaining the ON/OFF operations of the switching transistor shown in FIG. 5.
Figure 6B:
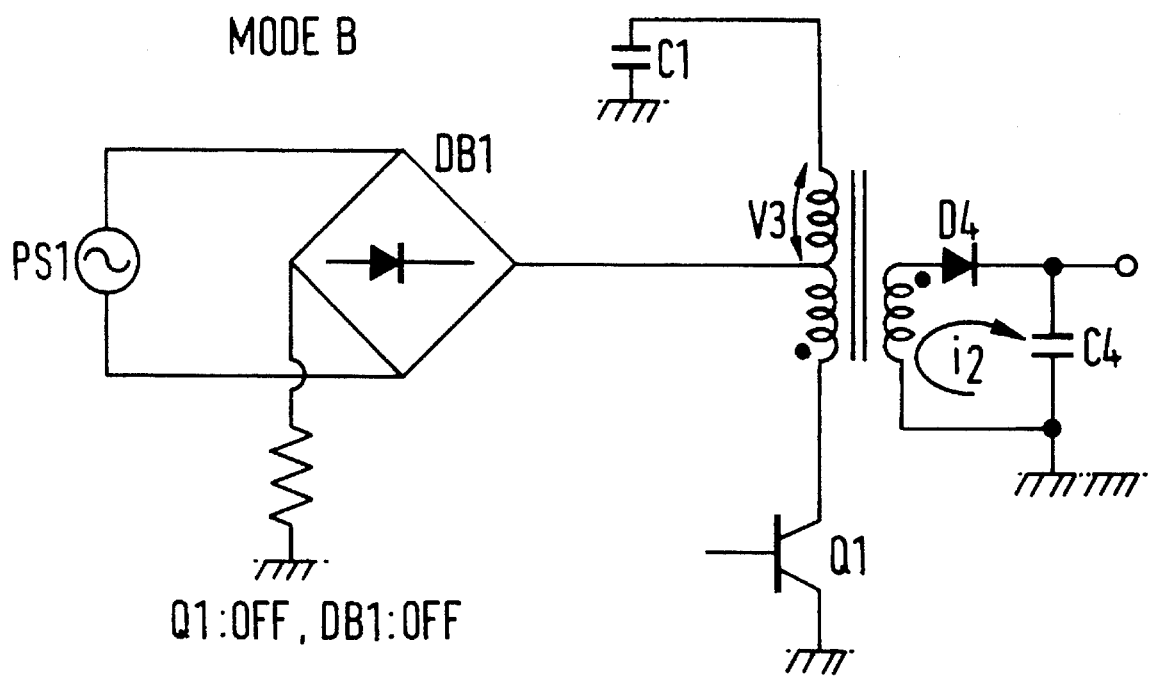
Figure 6C:
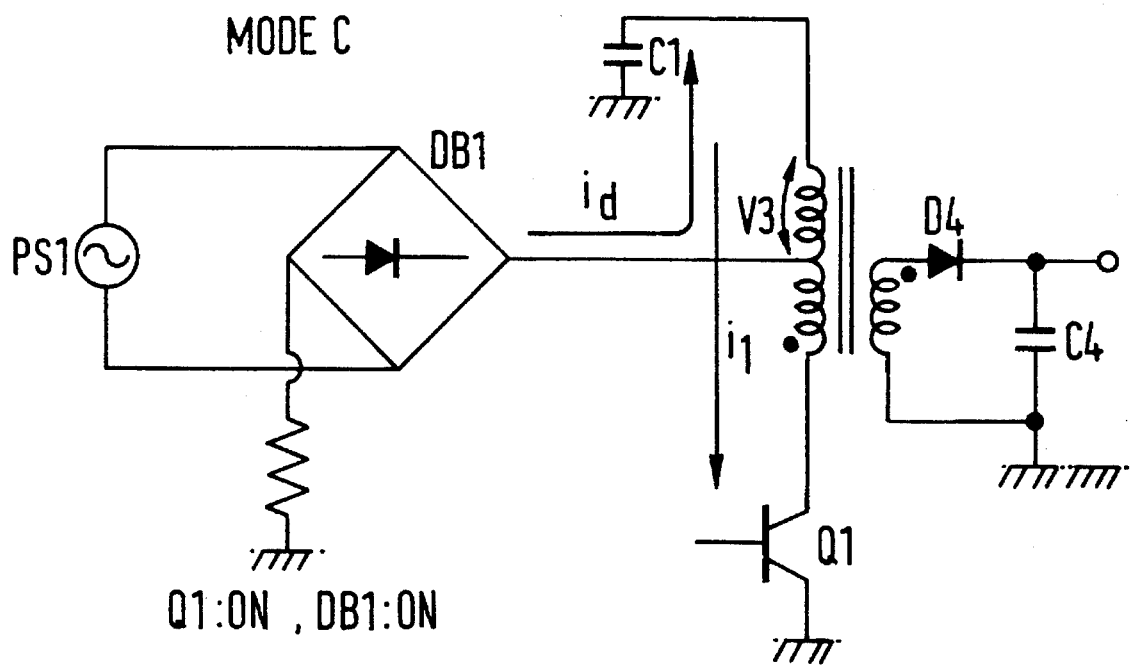
Figure 6D:
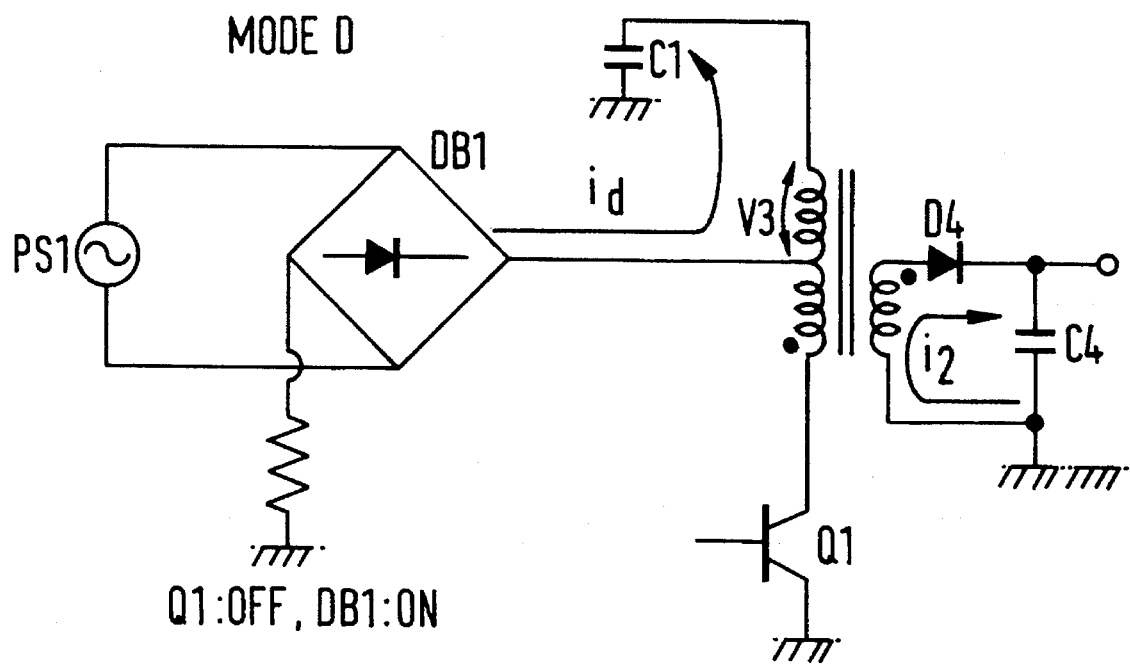

The operating state of the transistor Q1 and the diode bridge DB1 will be explained in reference to the following four modes, as shown in FIGS. 6(a), 6(b), 6(c) and 6(d).
FIG. 6(a)—Q1 is ON, DB1 is OFF;
FIG. 6(b)—Q1 is OFF, DB1 is OFF;
FIG. 6(c)—Q1 is ON, DB1 is ON: and
FIG. 6(d)—Q1 is OFF, DB1 is ON.

Each of the above states corresponds to the operating state in the four modes. Hereinafter, the modes as shown in FIGS. 6(a), 6(b), 6(c) and 6(d) will be presented as mode A, mode B, mode C and mode D.

Figure 7A:
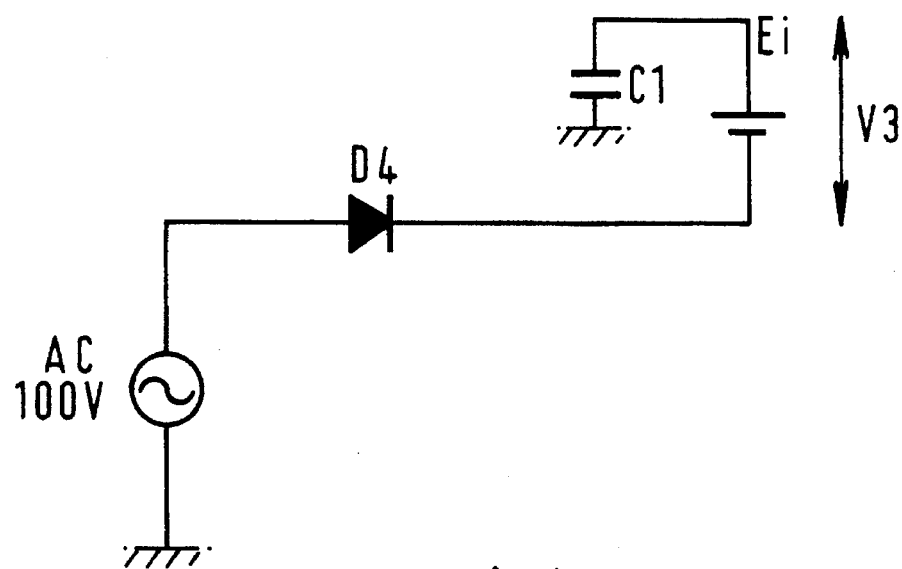
FIG. 7(a) shows an equivalent circuit diagram when the switching transistor shown in FIGS. 6(a) through 6(d) is in the OFF state and FIG. 7(b) shows AC voltage waveform V3 which is induced across a tertiary winding.
Figure 7B:
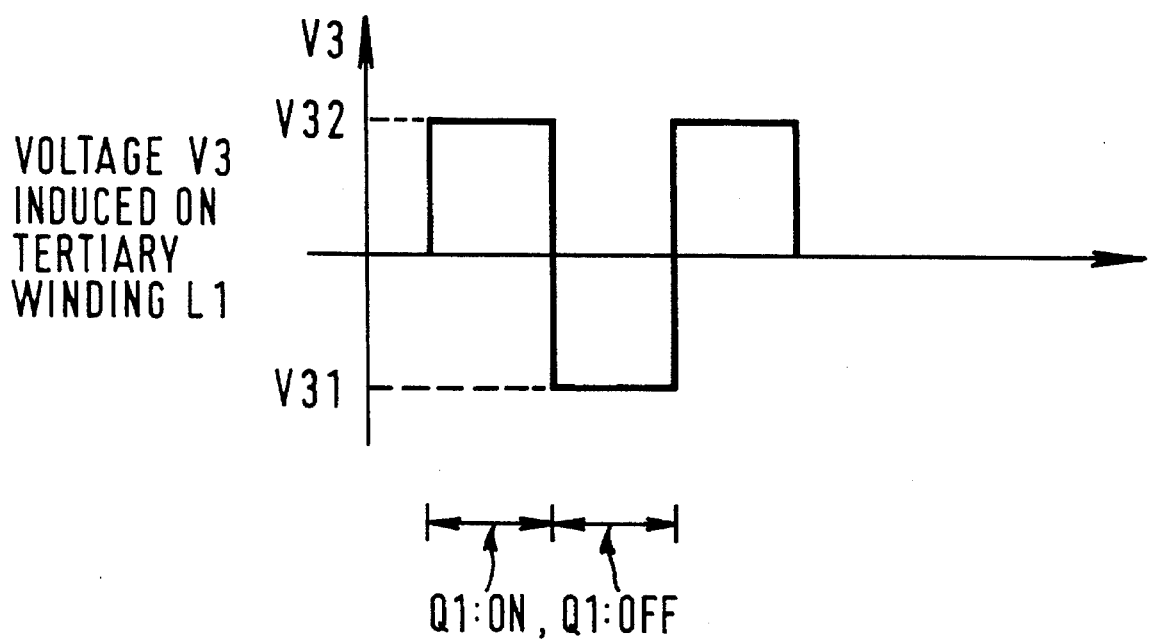

Modes A and B are the operations when the rectifier diode DB1 is in the OFF state and when the switching transistor Q1 is in the ON state, the primary current $i_1$ is supplied from the smoothing capacitor Q1 to the primary winding LP and the tertiary winding L1 as in mode A. When the switching transistor Q1 is turned OFF, the electromagnetic energy accumulated in the switching transformer T1 during the ON duration is released as the secondary current $i_2$ and the output voltage EB is obtained. Equivalent circuits of the AC voltage source, the rectifying diode DB1, and the tertiary winding L1 are shown in FIG. 7(a), while the AC voltage waveforms having peak-to-peak voltages V31 and V32 induced the tertiary winding L1 are shown in FIG. 7(b). FIGS. 8(a), 8(b) and 8(c) show the AC voltage waveform, the current waveform and the voltage V3 induced on the tertiary winding.

If the DC voltage generated across the smoothing capacitor C1 is given by $E_1$, the voltage induced on the tertiary winding L1 of the switching transformer is given by V3, the negative voltage generated when the switching transistor Q1 is OFF, as shown in FIG. 7(a) and 7(b), is given by V31, and the voltage generated when the switching transistor Q1 is ON, is given by V32, the AC voltage VAC will have a sine-wave envelope increasing with time. Thus at time t1 in FIGS. 8(a), 8(b) and 8(c) when VAC+V31$\geq$E$_1$, the rectifier diode DB1 is first turned ON state during the switching transistor Q1 being in OFF. The rectification current $i_d$ then flows to charge the smoothing capacitor C1, as shown in mode D.

Next, if the switching element Q1 is turned ON, the primary current $i_1$ is discharged from the smoothing capacitor C1 to the tertiary winding L1 and the primary winding LP, and positive voltage V32 is induced on the tertiary winding L1 in contrast with the above. This voltage is reverse biased against the conducting direction of the rectifier diode DB1.

At this time, VAC–V32 is smaller than $E_1$ (i.e. VAC–V32<$E_1$), and the rectifier diode DB1 is not turned ON and the operation is the same as the state of mode A.

Therefore, if VAC–V32 is smaller than $E_1$ throughout the whole period, there is no state of mode C. The rectifier diode BD1 is again turned ON and the smoothing capacitor C1 is charged. Since these operations are repeated for the periods of t1 through t6, the ON duration of the diode DB1 will become equal to the period of t1 through t6.

Here, the ON duration $\tau$ of the rectifier diode DB1 of a conventional power circuit, as shown in FIG. 3, will be compared with the ON duration of the power circuit of the present invention.

In the steady state, voltage is applied in the forward direction of the rectifier diode DB1 when the voltage relation of VAC–$E_1$ holds in the case of a conventional power circuit while in the duration when the switching transistor Q1 is in the OFF state, the voltage relation of VAC+V31–$E_1$ holds in the power circuit of the present invention.

Therefore, the forward bias voltage of the rectifier diode DB1 at the same AC voltage will increase in the power circuit of the present invention but, the time t1 when the rectifier diode DB is turned ON will become faster in the circuit of the present invention.

Furthermore, when the switching transistor Q1 is kept ON, the rectifier diode DB1 is kept OFF and therefore, if the duty ratio of the ON/OFF operation of the switching transistor Q1 is 1:1, the width will correspondingly expands by two or more times.

As a result, the ON duration of the rectifier diode DB1 becomes wider, the power factor increases, and the harmonic waves current $i_n$ decreases in the power circuit of the present invention more than in a conventional power circuit.

Further, at this time, if the voltage V31 generated in the OFF duration of the switching transistor Q1 increases by increasing the number of turns of the tertiary winding L1, and thus the time to turn the rectifier diode DB1 ON is shortened and the power factor can be further increased. Similarly, even when the duty ratio of the switching transistor Q1 is changed. The equivalent ON duration $\tau$ of the rectifier diode can be extended if the ON duration of the switching transistor Q1 is to be longer than the OFF duration.

As the smoothing capacitor C1 is provided as an essential component, the power circuit of the present invention has a benefit that the collector current of the switching transistor Q1 is a mean level, a cheap current driving type switching transistor Q1 can be used, and a sharp rating increase of the switching transformers and the switching transistors will become unnecessary.

Further, the power circuit of the present invention has an enhanced effect by having the time constant of a capacitor compared to a voltage driving type circuit, and will protect against a momentary power failure and a momentary voltage fluctuation of the AC power line. Thus a stabilized power can be obtained without causing output fluctuation momentarily following a fluctuating component.

Furthermore, as the ON duration τ of the rectifier diode DB1 is longer than that of the circuit shown in FIG. 1. The ripple voltage of the smoothing capacitor C1 decreases and its capacitance can be made reduced.

When the tertiary winding L1, as shown in FIG. 5, is wound, the negative voltage V31 induced on the tertiary winding L1 during the OFF duration of the switching transistor Q1 is proportional to the rectified output EB of the voltage induced across the secondary winding. On the other hand it is controlled by the error signal from the error amplifier IC2 to make the rectified output voltage EB constant and the negative voltage is also kept constant.

In state where load current is increased (increases of harmonic components) as a result of a drop of in the input AC voltage, that is, in the overloaded state, as a negative voltage increases corresponding to the increase of the load current and fluctuating components in inputs are controlled at constant levels, it becomes possible to suppress the fluctuation of the power factor and the occurrence of harmonic components.

The ON duration τ of the rectifier diode DB1 is extended equivalently by using the negative voltage V31 of the tertiary winding L1 and it is therefore possible to provide a power source with a high power in a simple circuit structure.

Other embodiments of the present invention will be described in reference to FIGS. 9 and 10.

Figure 9:
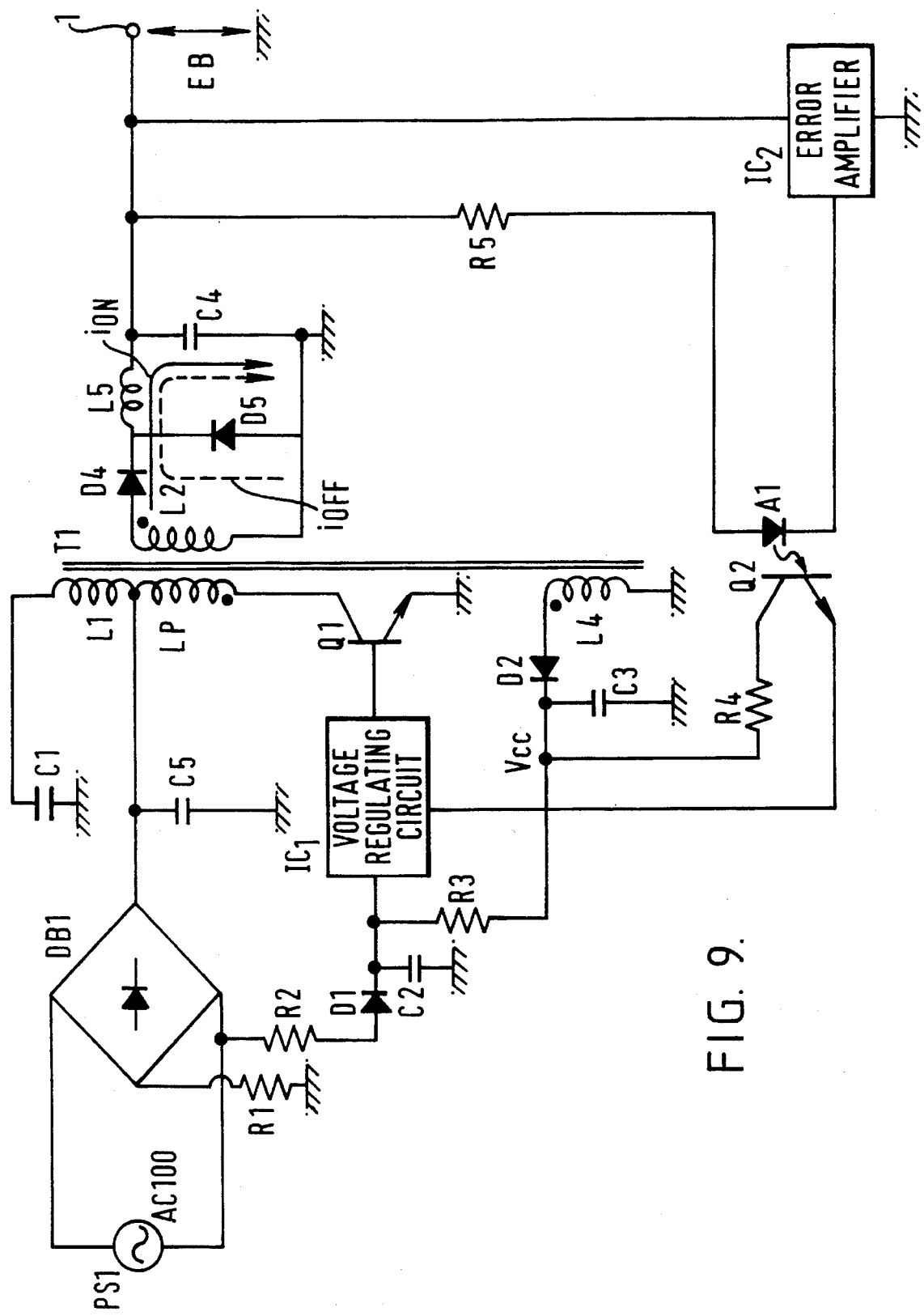
FIG. 9 is a circuit diagram showing a modification of the power circuit according to the present invention.

FIG. 9 is a forward type switching regulator equipped with a power circuit according to the present invention, wherein a choke coil L5 and a diode D5 are incorporated and connected with the secondary side of the transformer T1. In this FIG. 7, the secondary side rectified voltage EB is obtained by applying the current $i_{ON}$ in the direction of the solid line through the choke coil L5 during the ON duration of the switching transistor Q1 and the current $i_{OFF}$ in the direction of the broken line during the OFF duration.

Figure 10:
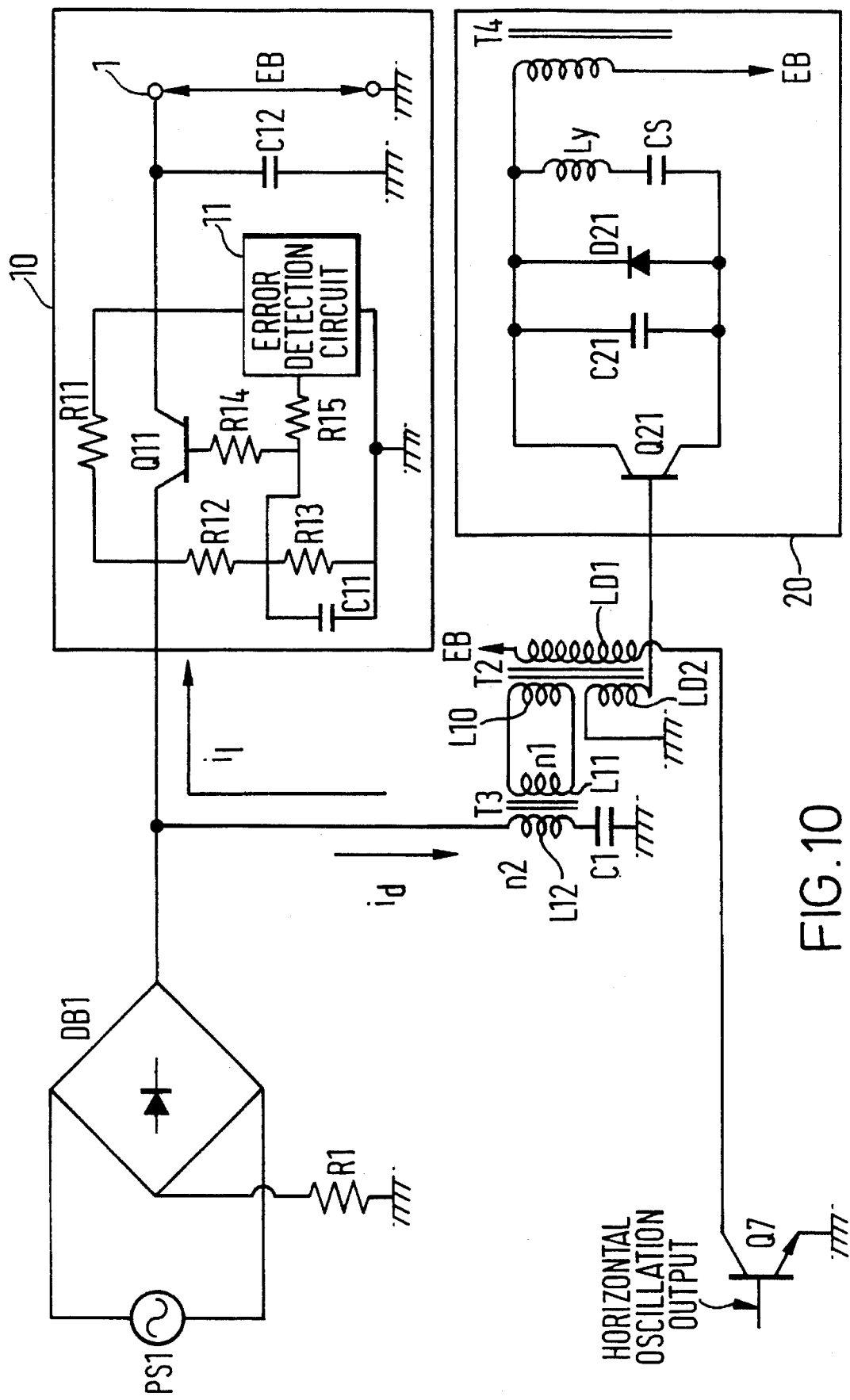
FIG. 10 is an embodiment of the power circuit of the present invention applied to a horizontal deflection circuit of a TV receiver.

FIG. 10 is a circuit including a horizontal deflection circuit of a TV receiver.

First, the construction of the circuit, as shown in FIG. 10, will be explained.

The single-phase AC line of the AC power source PS1 is connected to the full-wave rectifier circuit DB1. The output of the rectifier circuit DB1 is connected to a series path regulator 10 including a base grounding type transistor Q11.

Further, the output of the rectifier circuit DB1 is connected to a ground reference potential source by the capacitor C1 via the secondary winding L12 of the transformer T3.

The series path regulator 10 is comprised of an error detection circuit R11, a feedback resistor R11, bias resistors R12, R13, R14 and R15, and a bias capacitor C11. A smoothing capacitor C12 is connected in parallel with the series path regulator 10.

Further, the transformer T2 is a horizontal driving transformer. A horizontal driving pulse from a horizontal oscillation circuit (not shown) is supplied to the base of a transistor Q1 and the input winding LD1 of the transformer T2 is driven by the collector output of the transistor Q1.

In a horizontal deflection circuit 20, a horizontal driving pulse is supplied to a horizontal output transistor Q21 via an output winding LD2 of the driving transformer T2, a damper diode D21, a resonance capacitor C21 and a deflection coil Ly are all connected in parallel. The deflection coil Ly is also connected in series with an S-shaped correction capacitor CS.

The voltage from the output terminal 1 of the series path regulator is supplied to the transformers T2 and T4 as their power supply voltages.

Further, a secondary output winding L10 of the driving transformer T3 is induction coupled with the primary winding L11 of a pulse transformer T3.

Now the operation of the circuit, as shown in FIG. 10, will be explained.

The pulse transformer T3 is inserted between the rectifier diode DB1 and the smoothing capacitor C1, and electric power is supplied to the stabilized power circuit 10 from the connecting node of a secondary winding L12 of the pulse transformer T3 and the output of the rectifier diode DB1.

The output winding L10 of the driving transformer T2 is connected to the primary winding L11 of the pulse transformer T3. The rectangular wave pulse voltage induced on winding L10 is presented on the secondary winding L12 of the pulse transformer T3.

This rectangular wave pulse voltage is of the same waveform as that shown in FIGS. 7(a) and 7(b).

By this voltage, the diode DB1 in the rectifier circuit is forward or reverse biased, and thus the rectified current $i_d$ flows as shown in FIG. 10. As explained in the embodiment described above, the load current $i_1$ is supplied to the series path regulator during the period when positive voltage V32 is generated. By repeating this operation, it is possible to extend the ON duration of the rectifier diode DB1 and improve a power factor.

Figure 11:
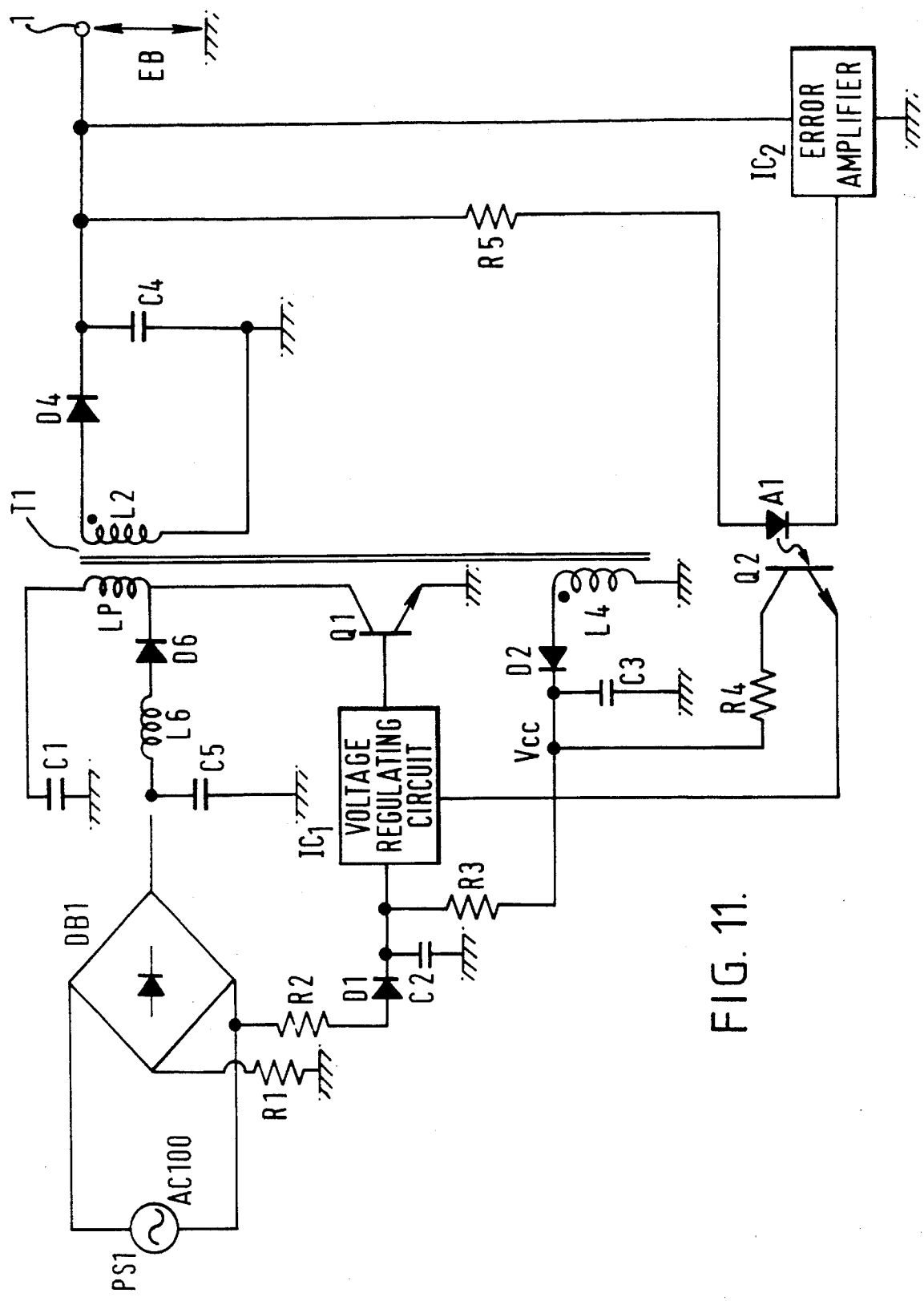
FIG. 11 is a circuit diagram showing another embodiment of the power circuit of the present invention.

FIG. 11 is another embodiment of a power circuit of the present invention.

In FIG. 11, the same elements as those in FIG. 1 will be explained by assigning the same reference numerals and letters used in FIG. 1.

The AC power source PS1 is connected to a small noise removing capacitor C5 via the full-wave rectifier circuit DB1. The choke coil L8 is connected to the output of the rectifier circuit DB1. The choke coil L8 is also connected to the anode of the rectifier diode D8. The cathode of this rectifier diode D8 is connected to the primary winding LP of the transformer T1 and the collector of transistor Q1. The emitter of the transistor Q1 is connected to the reference potential and a control signal is supplied to the base of the transistor Q1 from the voltage regulator IC1.

The other end of the primary winding LP of the transformer T1 is connected to the reference potential at the capacitor C1. The secondary winding L2 of the transformer T1 outputs a voltage to the output terminal 1 via the rectifier/smoothing circuits D4/C4. The output of the rectifier/smoothing circuit D4/C4 is connected to the error amplifier IC2 and an error signal is supplied to a photo-coupler connected between the error amplifier IC2 and the output. The photo-coupler contains a diode A1 and a transistor Q2. The output of the transistor Q2 is connected to the voltage regulating circuit IC1 and a control signal for regulating an output voltage value EB is supplied to the base of the transistor Q1.

Further, a starting signal is supplied from the single phase AC return line to the voltage regulating circuit IC1 via the rectifier circuit D1. The power supply voltage VCC for the transistor Q2 of the photo-coupler and the voltage regulating circuit IC1 is supplied from the rectified signal of a tertiary winding L4 of the transformer via the rectifier diode and the smoothing capacitor C3. The power supply voltage VCC and the starting signal are supplied to the voltage regulating circuit IC1 through a common line.

The operation of the circuit shown in FIG. 11 will be explained in reference to FIGS. 12(a), 12(b), 13(a), 13(b) and 13(c).

Figure 12A:
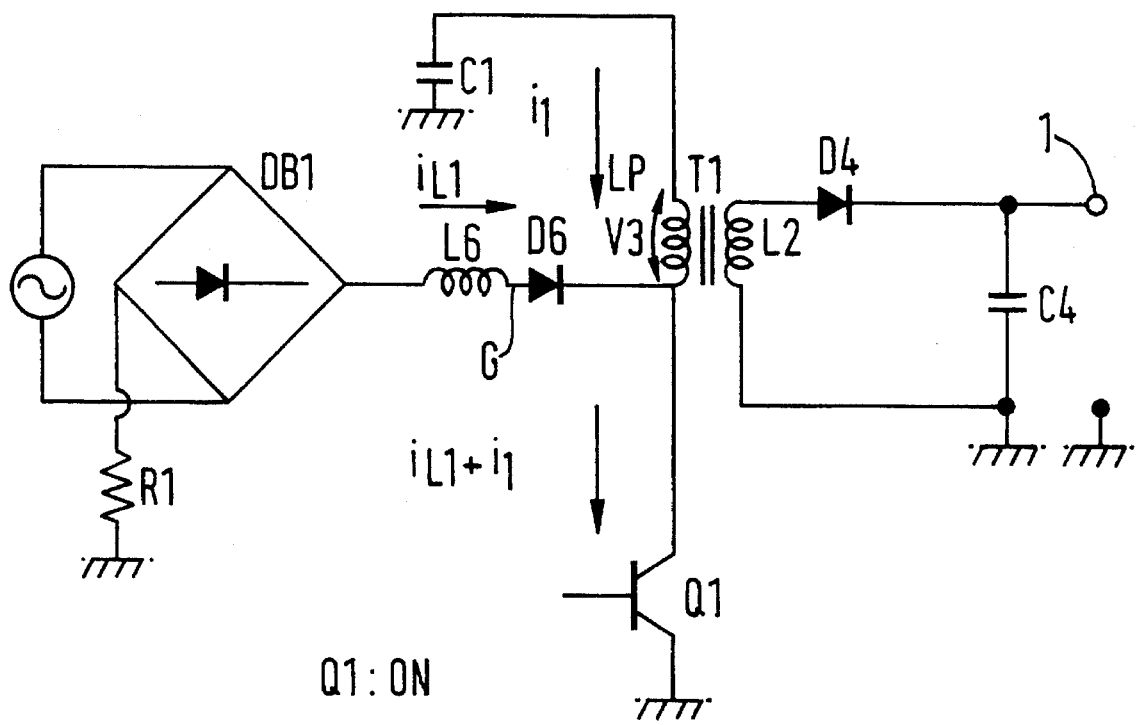
FIGS. 12(a) and 12(b) are diagrams for explaining the ON/OFF operations of the switching transistor shown in FIG. 11.
Figure 12B:
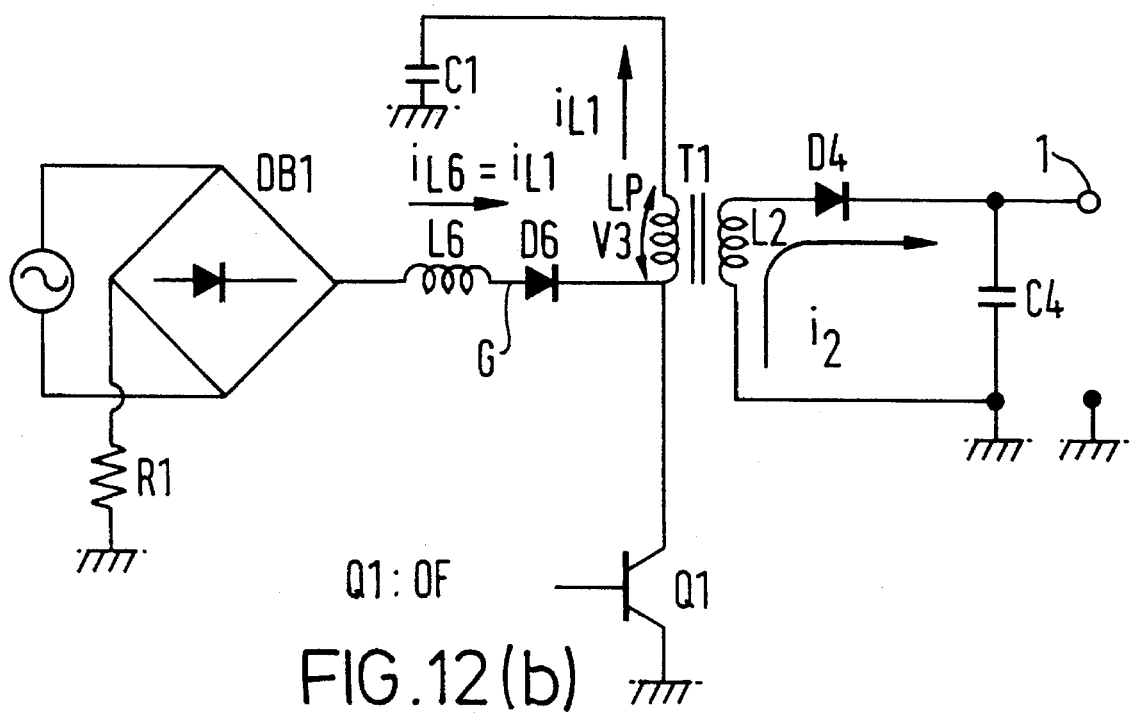

FIG. 12(a) shows the switching transistor Q1 in the ON state, while FIG. 12(b) shows the switching transistor Q1 in the OFF state.

When the switching transistor Q1 is in the OFF state, the primary current $i_{L1}$ charges the capacitor C1 via the choke coil L8. The pulsating AC voltage waveform is smoothed by the smoothing capacitor C1 and the rectifier diode DB1 is turned ON by the output voltage $E_1$ of the smoothing capacitor C1 and the AC voltage waveform VAC.

When the current flow according to the forward characteristic of the diodes DB1 and D6, the change in voltage pursuant to the time change of the current is caused by the choke coil 6. This time relationship is a linear relation and is caused by the charge/discharge of electromagnetically induced energy responsive to the ON/OFF operations of the switching transistor Q1.

The current flowing to the capacitor C1 during the OFF state generates a voltage and charges the capacitor C1. This voltage becomes a series of rectangular wave pulses which are added to the collector of the transistor Q1.

Now, the current flowing through the primary winding LP of the transistor T1 via the choke coil 6 is assumed to be $i_{L1}$ and the current flows as a result of the discharge of the capacitor C1 is assume to be $i_1$.

The secondary side current $i_2$ is induced by the polarity of the diode and the current of the primary winding in the half-wave rectifier circuit D4.

The operations of the circuit will be explained in further detail with reference to the operating waveforms.

When the switching transistor Q1 is turned ON, the current $i_{L1}$ flows from the AC power source PS1 via the choke coil L6 and, the current $i_1$ flows to the primary winding LP of the switching transformer by the voltage $E_1$ previously stored across the smoothing capacitor C1. The waveforms of the operating currents at this time are shown in FIGS. 13(a), 13(b) and 13(c). The currents $i_{L1}$ and $i_1$ vary in almost linear in relation with time. Thus during the duration when Q1 is ON, electromagnetic energy expressed below in Equation 4 is stored in respective inductances L6 and LP.

$$\tfrac{1}{2} L6 \cdot i_{L1}^2, \tfrac{1}{2} LP \cdot i_1^2 \qquad \text{[Equation 4]}$$

If the AC power source VAC is given as $Em \, SIN \, (\omega t + \phi)$, the voltage across the smoothing capacitor is $E_i$ and an initial value is 0, the currents $i_{L1}$ and $i_1$ during the duration when Q1 is ON are given by the following Equations 5, respectively.

$$i_{L1} = \frac{E_n}{\omega L1} \{1 - \cos(\omega t + \phi)\} \qquad \text{[Equations 5]}$$

$$I_{L1} = \frac{E_1}{LP} t$$

When the time t1 in FIGS. 13(a), 13(b) and 13(c) is reached, the switching transistor Q1 is turned OFF. Thus the electromagnetic energy stored previously in the primary winding LP of the switching transformer T1 is released as the secondary winding current $i_2$ is, rectified and smoothed, as shown in FIGS. 12(a) and 12(b), so as that the output voltage EB is obtained.

Further, the energy stored in the first choke coil L6 is released as the current $i_{L1}$ from the first choke coil L6 through the diode D2 and the primary winding LP to the smoothing capacitor C1 and charges the capacitor C1.

If the time t1 shown in FIGS. 13(a), 13(b) and 13(c) given as a reference time 0 (coordinate origin) and the currents flowing through the circuit at the time t1 (the initial condition) is given as $i_{L1}(0)$ and $i1(0)$, the current $i_{L1}$ (TOFF) flowing through the first coil LP when Q1 is OFF, in other words, the current $i_{C1}$ flowing into the smoothing capacitor C1 is given by the following Equation 6. The AC power source is given by $Em \, SIN \, \omega (t + _{ON} + \phi/\omega)$ and the smoothing capacitor C1 has a large capacitance and can be assumed be a short-circuit for the AC current. Em represents a sine-wave enveloped amplitude. $\omega$ represents an angular frequency. $T_{ON}$ represents the ON duration of a transistor. $\phi$ represents an initial phase.

$$i_{L1}(T_{OFF}) = i_{C1} = \qquad \text{[Equation 6]}$$

$$\frac{E_n}{\omega L1} \left\{ 1 - \cos\omega\left(t + T_{ON} + \frac{\phi}{\omega}\right) \right\} +$$

$$\frac{i}{L1 + LP}(L1 \cdot i_{L1}(0) - LP \cdot i_1(0)) - \frac{E_1}{L1 + LP} \cdot t$$

The first term of the above Equation 6 denotes the charging current from the AC power source. Also, the second term denotes the charging current by the initial current flowing through the circuit at the time of t1. The third term denotes the current flowing backward to the power source from the smoothing capacitor. Here, from the Equation 6 the currents $_{L1}$ (0) and $i_1$ (0) will be obtained as expressed as following Equations 7.

$$i_{L1}(0) = \frac{E_n}{\omega L1} \left\{ 1 - \cos\omega\left(t + \frac{\phi}{\omega}\right) \right\} \qquad \text{[Equations 7]}$$

$$i_{L1} = \frac{E_1}{LP} T_{ON}$$

$$i_{C1} = \frac{E_n}{\omega(L1 + LP)} \left\{ 1 - \cos\omega\left(t + T_{ON} + \frac{\phi}{\omega}\right) \right\} +$$

$$\frac{E_n}{L1 + LP} \left[ \frac{L1 \cdot E_n}{\omega \cdot L1} \left\{ 1 - \cos\omega\left(t + T_{ON} + \frac{\phi}{\omega}\right) \right\} - \right.$$

$$\left. \frac{LP}{LP} \cdot E_1 \cdot T_{ON} \right] - \frac{E_1}{LP + L1} \cdot t$$

$$= \frac{E_n}{\omega(L1 + LP)} \left\{ 1 - \cos\omega\left(t + T_{ON} + \frac{\phi}{\omega}\right) + 1 - \right.$$

$$\left. \cos\omega\left(t + \frac{\phi}{\omega}\right) \right\} - \frac{E1}{L1 + LP} \cdot (t + T_{ON})$$

If the ON period $T_{ON}$ of the switching transistor Q1 is sufficiently short compared to the period 20 mS (AC frequency 50 Hz) of the AC power source PS1, the approximation of the following Equation 8 will hold.

$$\cos\omega\left(t + T_{ON} + \frac{\phi}{\omega}\right) \cong \omega\left(t + \frac{\phi}{\omega}\right) \qquad \text{[Equation 8]}$$

Thus the following Equation 9 will be established.

$$i_{C1}(t) \cong \frac{2E_n}{\omega(L1 + LP)} \left\{ 1 - \cos\omega\left(t + \frac{\phi}{\omega}\right) \right\} - \qquad \text{[Equation 9]}$$

$$\frac{E_1}{L1 + LP} \cdot (t + T_{ON})$$

The collector current $i_{C1}$ (t1) at the time $\theta t = t1$) when the switching transistor is turned OFF and the capacitor charging current $i_{C1}(t)$ at the time (t=t2) when the switching transistor is turned ON are obtained as shown below by substituting t=0 and t=TOFF, respectively, in the above Equation 9 for calculating the capacitor charging current $i_{C1}$.

$$i_{C1}(t1) \cong \frac{2E_n}{\omega(L+LP)} \{1 - \cos\phi\} - \frac{E_1}{L1+LP} \cdot (T_{ON}) \quad \text{[Equation 10]}$$

$$i_{C1}(t2) = i_{C1}(T_{OFF}) = \frac{2E_n}{\omega(L1+LP)} \left\{ 1 - \cos\omega\left(T_{OFF} + \frac{\phi}{\omega}\right) \right\} -$$

$$\frac{E_1}{L1+LP} \cdot (TOFF + T_{ON})$$

In the above Equation 10 the first term shows the charging current of the smoothing capacitor when the switching transistor Q1 is OFF, and the second term shows the discharging current. If a value of the first term becomes larger than a value of the second term at the time when the AC power source is large, the diodes DB1 and D6 are turned ON and the charging current flows into the smoothing capacitor C1. When the conditions for turning the diodes DB1, D6 at this time are obtained from following Equations 11.

$$1 - \cos\phi \geqq \frac{\phi \cdot E_i}{2E_n} \cdot T_{ON} \quad \text{[Equations 11]}$$

$$\cos\phi \leqq 1 - \frac{\omega \cdot E_i}{2E_n} \cdot T_{ON}$$

For the period with the initial phase deducted from one period $2\pi$ from the initial phase $\phi/\omega$ shown in the above equation, that is, the period from t1 to t2 shown in FIGS. 18(a), 18(b) and 18(c), the diodes DB1 and D6 are in the ON state. Thus the rectified current flows into the smoothing capacitor from the AC power source. This state is shown in FIGS. 18(a), 18(b) and 18(c).

The voltage across the smoothing capacitor C1 at this time depends on the relation with the voltage when the switching transistor Q1 is turned OFF and will become the nearly the same value as that of a conventional full-wave rectifier circuit.

In FIGS. 12(a) and 12(b) the voltage appearing on the node G in the OFF duration of the switching transistor Q1 is given by VA=Em/TOFF.

On the other hand, the voltage induced on the primary winding LP of the switching transformer T1 becomes VLP=V1=($T_{ON}/T_{OFF}$).

If the duty ratio of the ON/OFF operation of the switching transistor Q1 is 1:1. VA=2VAC and VLP=v1=$E_1$ and the forward bias voltage of the rectifier diode increases for VAC and decreases for V1, as in case of the circuit in FIGS. 12(a) and 12(b).

Because of the relation of amplitude Em>V1 of the AC power source (VAC=Em SIN $\omega$t), the voltage $E_1$ across the smoothing capacitor increases slightly more than a conventional circuit; however, if the load current is small, this difference is less than 10 V and therefore, the voltage E1 across the smoothing capacitor C1 of the circuit, as shown in FIG. 1, will become almost equal to that of the circuit, as shown in FIG. 11.

As a result of the operations described above, the rectified current width τ becomes large and it is possible to increase power and reduce the high-frequency current. FIGS. 14(a) and 14(b) are diagrams showing the waveforms of the collector current iC1 observed within the ON/OFF durations of the switching transistor Q1, which flows in the smoothing capacitor C1 at the time when the current $i_{L1}$ flowing through the first choke coil L6 is small (the initial state) and at the time when it becomes a maximum.

While the switching transistor Q1 is kept in the ON state, the current $i_{L1}$ is flowing through the choke coil L1. It can be seen that if the current flowing through the choke coil L1 becomes large. the DC level of the collector current $i_{C1}$ becomes high and the smoothing capacitor C1 is charged. According to the bias condition of the rectifier diode DB1, the second side driving capacity will be improved.

Figure 15:
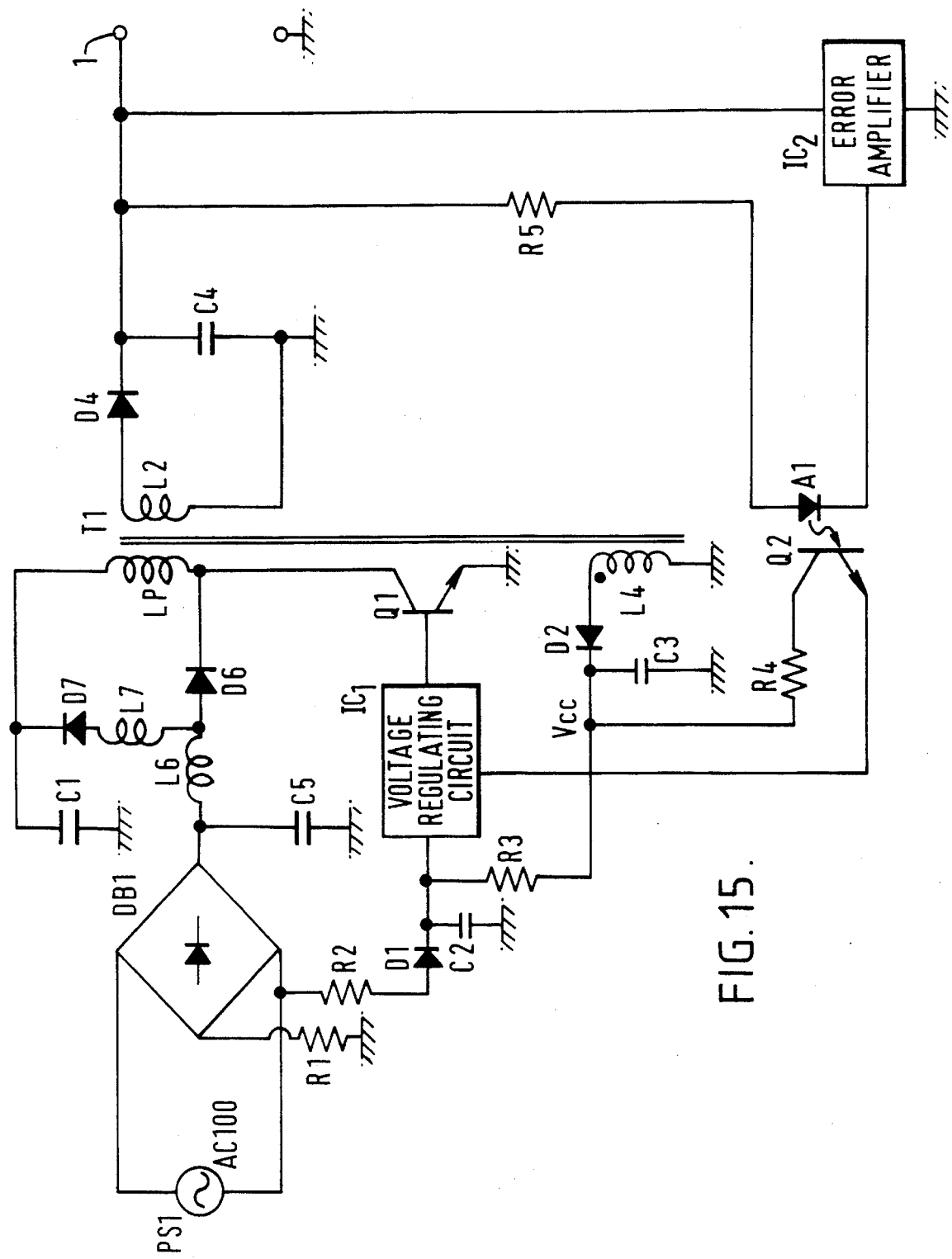
FIG. 15 is a modification of a power circuit shown in FIG. 11.
Figure 17:
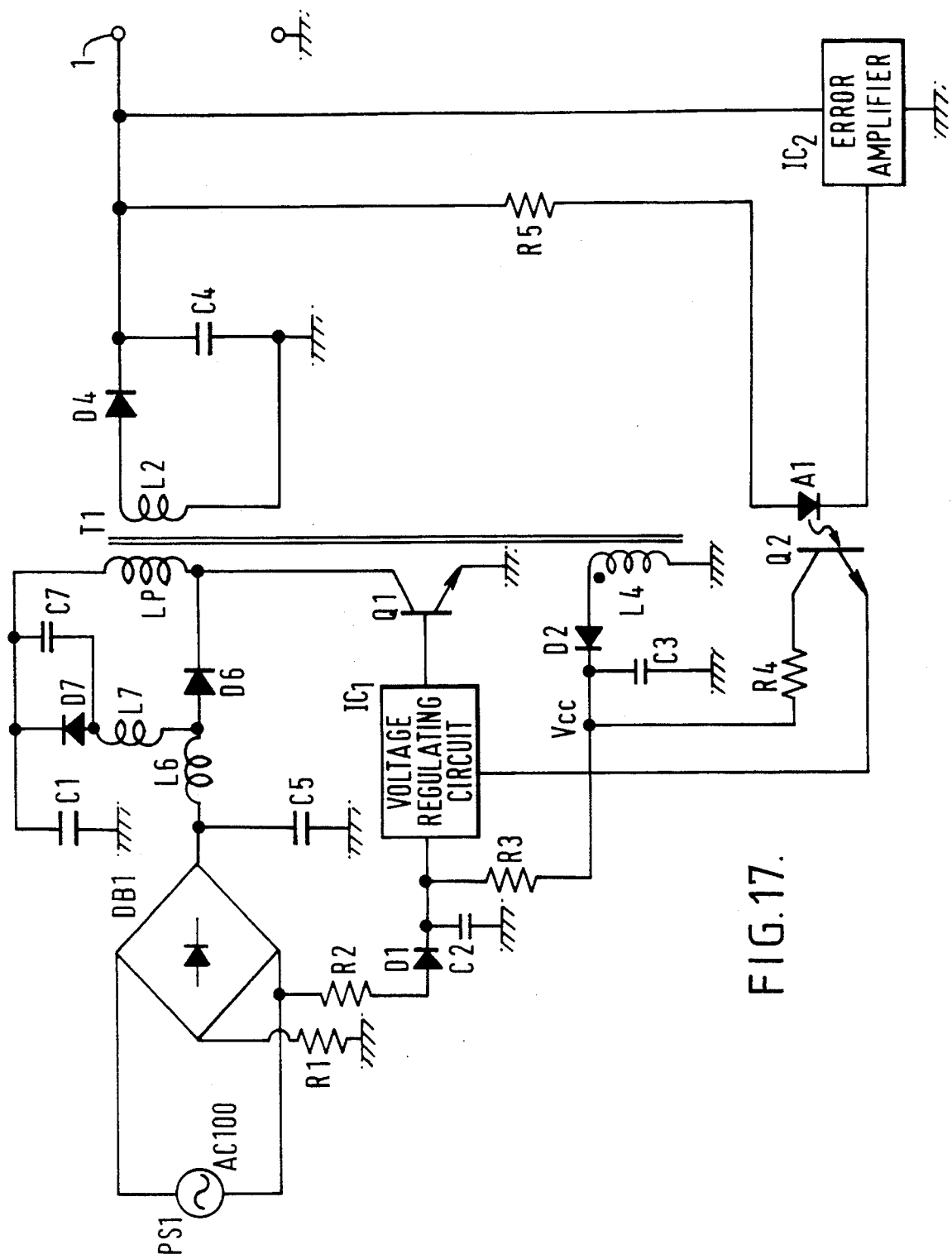
FIG. 17 is another modification of the power circuit shown in FIG. 11.

Referring to FIGS. 15 and 17, modifications of the power circuit of this embodiment will be described.

In FIG. 15, the diode 6 is connected between the choke coil L6, which is connected to the output of the full-wave rectifier circuit, and the primary winding LP of the transformer T1 shown in FIG. 11 series circuit of the choke coil L7 and the diode D7 is provided in parallel with the diode D6 and the primary winding LP, and the other end of this series circuit is short-circuited to the reference potential via the capacitor C1. The other portion of the circuit configuration is the same as that of FIG. 11, and the same elements will be explained by assigning the same reference numerals and letters.

The operations of this circuit will be explained in reference to FIG. 16.

The following Equation 12 is obtained by assuming that the input AC voltage VAC is given by VAC=EmSIN $\omega$(t+TON+$\phi$/$\omega$).

$$i_{L6} = \frac{2E_n}{\omega(L+L6)} \left\{ 1 - \cos\omega\left(t + \frac{\phi}{\omega}\right) \right\} - \quad \text{[Equation 12]}$$

$$\frac{E_1}{L+L6} \cdot \left(t + \frac{L}{LP} T_{ON}\right) = i_{C1}$$

$$i_{L1} = \frac{L7}{LP+L7} \cdot i_{L6} - \frac{E_i \cdot T_{ON}}{LP+L7}$$

$$i_{L7} = i_{L6} - i_{L1} = \frac{LP}{LP+L7} \cdot i_{L6} + \frac{E_i \cdot T_{ON}}{LP+L7}$$

$$L = \frac{L7 \cdot LP}{L7+LP}$$

Figure 16:
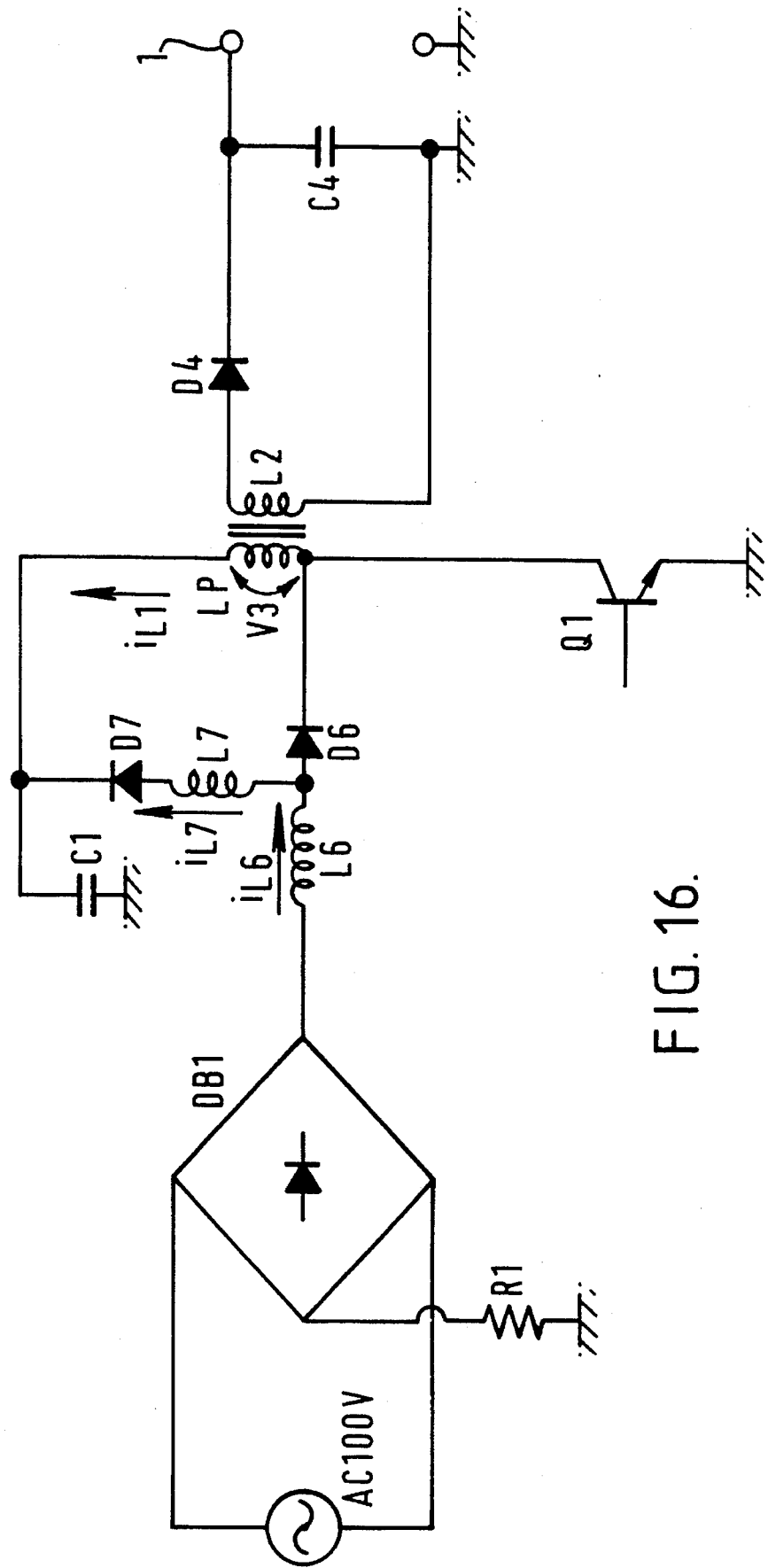
FIG. 16 is an explanatory diagram for explaining the operation of the circuit shown in FIG. 15.

In the circuit shown in FIG. 16, when the switching transistor Q1 is in the OFF period, the current $i_{L1}$ flowing through the first choke coil L6 also flows in the smoothing capacitor C1 through the primary winding LP of the switching transformer. Furthermore, the peak value of this current $i_{L1}$ changes at the same frequency as the AC power source. Therefore, if the secondary side output current (negative current) is large, the current $i_{L1}$ also becomes large and thus ripples of the power source period may appear in the output voltage in some cases.

Further, as can be seen from the Equation 9, if negative current is large, a corresponding charging current from the AC power source increases. Therefore, a value of the first choke coil L6 must be lowered. In this case, a switching transistor Q1 having sufficient current ratings voltage ratings, etc., becomes necessary. The current $i_{L6}$ flowing through the first choke coil L6 when the switching transistor Q1 is kept OFF is branched into the current $i_{L7}$ flowing to the second choke coil and the current $i_{L1}$ flowing to the primary winding LP. As the amount of the current change of the primary winding can be suppressed by branching the current, a ripple factor due to inductance can be reduced. Further, this effect will be explained quantitatively using Equation 12.

An inductance L, a denominator of the first term of the Equation 12, is a value when the second choke coil L7 and the primary side winding inductance LP are in parallel with each other and therefore, even in case of the same LP value, a denominator becomes small and it is possible to cope with load increase without reducing a value of LP and raising ratings of the switching transistor Q1.

The circuit of FIG. 15 is an example which may conform with the load increase, so that it is possible to compose a power circuit without using the higher rated circuit parts typically required by increased loads.

FIG. 17 shows a modification further to the example of FIG. 15 wherein elements are added so as to expand the "ON" phase angle. That is, in FIG. 17, the expansion of the ON phase angle is achieved by connecting the capacitor C7 in parallel with the diode D7 of the series circuit. Thus the example of FIG. 17 is able to obtain a rectified AC current (see FIG. 18(c)) for the whole period, regardless of the polarity of the diode.

In the circuits, shown in FIGS. 11 and 15, there is the period $\phi/\omega$ in which no rectified current flows, as shown in FIG. 18(b). But it is possible to apply the rectified current even in the period, as shown in FIG. 18(c), by connecting a capacitor in parallel with a diode.

As described above, the present invention can provide an extremely preferable power circuit to accomplish the improvement of the AC-DC conversion efficiency through the improvement of the power factor of AC power sources, that is, the suppression of the harmonic components by extending the "ON" duration of a rectifier diode.

While the preferred embodiments of the present invention have been described, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, may be adopted subsequently during prosecution, for example, for the purposes of a divisional application.

What is claimed is:

1. A power circuit comprising:

input means for receiving an AC power supply voltage;

a primary circuit rectifier coupled to the input means for rectifying the AC power supply voltage;

a transformer having a primary winding, a second winding and a tertiary winding;

DC coupling means for coupling an output terminal of the primary circuit rectifier to a first end of the primary winding of the transformer;

a secondary circuit rectifier for rectifying a secondary circuit AC voltage induced across the secondary winding of the transformer to output a DC voltage;

a switching element coupled to a second end of the primary winding of the transformer;

control means for controlling a duty ratio of an ON/OFF operation of the switching element so that the DC voltage output from the secondary circuit rectifier is regulated; and switched frequency AC signal generating means, including the tertiary winding of the transformer and a first smoothing capacitor, a first end of said tertiary winding being coupled to the first end of the primary winding of the transformer, the first smoothing capacitor being coupled between a second end of the tertiary winding and a reference potential line, the generating means generating an AC signal responsive to the duty ratio of the ON/OFF operation of the switching element across the tertiary winding.

2. A power circuit as claimed in claim 1, wherein the secondary circuit rectifier includes a diode for rectifying the AC voltage induced on the second winding a choke coil of which one end is coupled to the diode, and a second smoothing capacitor coupled between the other end of the choke coil and the reference potential line.

3. A power circuit for TV receivers comprising:

input means for receiving an AC power supply voltage from an AC power line;

a rectifier circuit coupled to the input means for rectifying the AC power supply voltage and for outputting a rectified voltage at an output terminal;

a flyback transformer having at least one winding with a first end and a second end;

a voltage stabilizing circuit for stabilizing the rectified voltage from the output terminal of the rectifier circuit and for outputting a stabilized voltage;

means for supplying the stabilized voltage from the voltage stabilizing circuit to the first end of the winding of the flyback transformer;

a horizontal output transistor coupled to the second end of the winding of the flyback transformer;

a horizontal driving transformer having an input winding for receiving horizontal driving pulses, and a first and a second output windings for controlling the switching of the horizontal output transistor;

a tertiary transformer having a winding coupled by a first end to the output terminal of the rectifier circuit and also inductively coupled to the second output winding; and drive pulse frequency AC signal generating means, including a smoothing capacitor coupled between a second end of the tertiary winding and a reference potential line, for generating an AC signal responsive to a drive pulse across the tertiary winding.

4. A power circuit comprising:

input means for receiving an AC power supply voltage from an AC power line;

a primary circuit rectifier coupled to the input means for rectifying the AC power supply voltage;

a transformer having a primary winding and a secondary winding;

DC coupling means, including a series circuit of a choke coil and a diode, for coupling an output terminal of the primary circuit rectifier to a first end of the primary winding of the transformer;

a secondary circuit rectifier for rectifying a secondary circuit AC voltage induced across the secondary winding of the transformer which outputs a DC voltage;

a switching element coupled to a second end of the primary winding of the transformer;

control means for controlling a duty ratio of an ON/OFF operation of the switching element so that the DC voltage output from the secondary circuit rectifier is regulated; and a smoothing capacitor coupled between the first end of the primary winding and a reference potential source.

5. A power circuit comprising:

input means for receiving an AC power supply voltage from an AC power line;

a primary circuit rectifier coupled to the input means for rectifying the AC power supply voltage;

a transformer having a primary winding and a secondary winding;

DC coupling means, including a series circuit of a first choke coil and a first diode, for coupling an output terminal of the primary circuit rectifier to a first end of the primary winding of the transformer;

a secondary circuit rectifier for rectifying a secondary circuit AC voltage induced across the secondary winding of the transformer which outputs a DC voltage;

a switching element coupled to the first end of the primary winding of the transformer;

control means for controlling a duty ratio of an ON/OFF operation of the switching element so that the DC voltage output from the secondary circuit rectifier is regulated;

a smoothing capacitor coupled between a second end of the primary winding and a reference potential source; and a shunt circuit means including a series circuit of a second choke coil and a second diode which is coupled between the connecting node of the first choke coil and the first diode and the second end of the primary winding.

6. A power circuit as claimed in claim 5, wherein the shunt circuit means further include a second smoothing capacitor connected in parallel with the second diode.

* * * * *